(12) United States Patent
Lee et al.

(10) Patent No.: US 11,714,451 B2
(45) Date of Patent: Aug. 1, 2023

(54) FOLDABLE ELECTRONIC DEVICE INCLUDING ELECTRONIC PEN

(71) Applicant: Samsung Electronics Co., Ltd., Gyeonggi-do (KR)

(72) Inventors: Seokwoo Lee, Gyeonggi-do (KR); Minsoo Kim, Gyeonggi-do (KR); Joonwon Chang, Gyeonggi-do (KR); Jinwan An, Gyeonggi-do (KR); Jiwoo Lee, Gyeonggi-do (KR)

(73) Assignee: Samsung Electronics Co., Ltd.

( * ) Notice: Subject to any disclaimer, the term of this patent is extended or adjusted under 35 U.S.C. 154(b) by 0 days.

(21) Appl. No.: 17/698,367

(22) Filed: Mar. 18, 2022

(65) Prior Publication Data
US 2022/0206531 A1 Jun. 30, 2022

Related U.S. Application Data

(63) Continuation of application No. 17/024,801, filed on Sep. 18, 2020, now Pat. No. 11,281,254.

(30) Foreign Application Priority Data

Oct. 17, 2019 (KR) .................. 10-2019-0128996

(51) Int. Cl.
*G06F 1/16* (2006.01)
(52) U.S. Cl.
CPC ............ *G06F 1/1616* (2013.01); *G06F 1/169* (2013.01); *G06F 1/1643* (2013.01); *G06F 1/1652* (2013.01); *G06F 1/1681* (2013.01)

(58) Field of Classification Search
CPC combination set(s) only.
See application file for complete search history.

(56) References Cited

U.S. PATENT DOCUMENTS

| | | | |
|---|---|---|---|
| 8,295,037 | B1 | 10/2012 | Buuck |
| 8,564,551 | B2 | 10/2013 | Park |
| 9,891,663 | B2 | 2/2018 | Park et al. |
| 10,063,677 | B2 | 8/2018 | Cavallaro |

(Continued)

FOREIGN PATENT DOCUMENTS

| | | |
|---|---|---|
| CN | 109683761 | 4/2019 |
| EP | 3 462 572 | 4/2019 |

(Continued)

OTHER PUBLICATIONS

European Search Report dated Jul. 22, 2022 issued in counterpart application No. 20875882.1-1224, 9 pages.

(Continued)

*Primary Examiner* — Lisa Lea-Edmonds
(74) *Attorney, Agent, or Firm* — The Farrell Law Firm, P.C.

(57) ABSTRACT

Disclosed is an electronic device including an electronic pen, and a foldable housing comprising a first housing, a second housing rotatably connected to one side of the first housing, a third housing rotatably connected to an opposite side of the first housing, and a recess, which faces at least a part of the first housing in a folded state, provided in a first end of a bezel area of the third housing, wherein the recess is configured to accommodate the electronic pen when the electronic pen is inserted into the electronic device between the recess and the first housing.

20 Claims, 21 Drawing Sheets

(56) References Cited

U.S. PATENT DOCUMENTS

| | | | |
|---|---|---|---|
| 10,627,868 B2 | 4/2020 | Fujimoto | |
| 10,664,012 B1* | 5/2020 | Zimmerman | H04M 1/04 |
| 10,965,796 B2 | 3/2021 | Yang | |
| 11,010,020 B2* | 5/2021 | Li | G06F 3/04817 |
| 11,064,060 B2 | 7/2021 | Jang | |
| 11,281,254 B2* | 3/2022 | Lee | G06F 1/1616 |
| 11,538,370 B2* | 12/2022 | Kim | H04M 1/0268 |
| 11,605,796 B2* | 3/2023 | Kim | G06F 1/1681 |
| 2014/0035872 A1 | 2/2014 | Park | |
| 2014/0152576 A1 | 6/2014 | Kim et al. | |
| 2015/0227224 A1 | 8/2015 | Park et al. | |
| 2015/0277592 A1 | 10/2015 | Nishigaki | |
| 2015/0378557 A1 | 12/2015 | Jeong et al. | |
| 2017/0357292 A1 | 12/2017 | Cho et al. | |
| 2019/0103764 A1 | 4/2019 | Marshall et al. | |
| 2020/0192529 A1* | 6/2020 | Li | G06F 3/04817 |
| 2020/0192540 A1* | 6/2020 | Li | G06F 1/1618 |
| 2020/0364021 A1* | 11/2020 | Park | H04N 23/51 |
| 2020/0366770 A1 | 11/2020 | Kim | |
| 2021/0116962 A1* | 4/2021 | Lee | G06F 1/1652 |

FOREIGN PATENT DOCUMENTS

| | | |
|---|---|---|
| KR | 10-1669046 | 10/2016 |
| KR | 10-2017-0140976 | 12/2017 |
| KR | 10-2018-0092137 | 8/2018 |
| KR | 10-2021-0084044 | 7/2021 |

OTHER PUBLICATIONS

International Search Report dated Dec. 2, 2020 issued in counterpart application No. PCT/KR2020/012145, 3 pages.

* cited by examiner

FOLDABLE ELECTRONIC DEVICE INCLUDING ELECTRONIC PEN

CROSS-REFERENCE TO RELATED APPLICATION(S)

This application is a Continuation Application of U.S. patent application Ser. No. 17/024,801, filed on Sep. 18, 2020, and is based on and claims priority under 35 U.S.C. § 119 to Korean Patent Application No, 10-2019-0128996, filed on Oct. 17, 2019, in the Korean Intellectual Property Office, the entire disclosure of each of which is incorporated herein by reference.

BACKGROUND

1. Field

The disclosure relates generally to an electronic device, and more par arty, to an electronic device including an electronic pen.

2. Description of Related Art

In recent years, as functional gaps between the manufacturers of electronic devices have significantly decreased, efforts have been made to increase the strength of electronic devices, which continue to become more slim to satisfy consumer demands and distinguish functional elements. Shapes of the electronic devices are gradually changing. For example, the electronic devices may have a deformable structure in which a large screen display may be used while in transit. Foldable electronic devices in which a plurality of housings are operated while contacting each other have been introduced.

A multi-foldable electronic device may include a plurality of housings that perform a folding operation when the housings are folded with respect to each other. A large-screen display may be used in an unfolded state and the volume thereof may be reduced in a folded state, enhancing ease of portability of the foldable electronic device. The foldable electronic device may be operated in an out-folding scheme in which a display is exposed to the outside when a plurality of housings are folded, an in-folding scheme in which the display is not exposed to the outside, or a complex folding scheme in which both the out-folding scheme and the in-folding scheme are used such that only a portion of the display is exposed to the outside.

The electronic device may include an electronic pen (e.g., a stylus pen) detachably disposed as an accessory electronic device. The electronic pen may perform an input through a detection panel (e.g., a digitizer or a touch panel) disposed in the interior of the electronic device. The electronic pen provides ease of input, but the portability of the foldable electronic device tends to be compromised. For example, the electronic pen being embedded in the electronic device may hamper slimness of the electronic device. In addition, the electronic pen being arbitrarily attached to an outer surface of the electronic device through a magnetic force tends to cause an unstable attachment state, resulting in loss of the electronic pen and potential damage the display.

Therefore, there is a need in the art for an electronic device which more conveniently and safely stows the electronic pen.

SUMMARY

The disclosure is provided to address at least the above-mentioned problems and/or disadvantages and to provide at least the advantages described below.

Accordingly, an aspect of the disclosure is to provide a foldable electronic device including an electronic pen, wherein the foldable electronic device prevents a potential for loss or unintentional movement of the electronic pen and realizes improved portability by providing a stable mounting space for the electronic pen.

Another aspect of the disclosure is to provide a foldable electronic device including an electronic pen, which provides a stable mounting space while contributing to slimness of the electronic device.

Another aspect of the disclosure is to provide a foldable electronic device including an electronic pen, which can perform a charging function in various charging modes.

In accordance with an aspect of the disclosure, there is provided an electronic device including an electronic pen, and a foldable housing comprising a first housing, a second housing rotatably connected to one side of the first housing, a third housing rotatably connected to an opposite side of the first housing, and a recess, which faces at least a part of the first housing in a folded state, provided in a first end of a bezel area of the third housing, wherein the recess is configured to accommodate the electronic pen when the electronic pen is inserted into the electronic device between the recess and the first housing.

In accordance with another aspect of the disclosure, there is provided an electronic device including an electronic pen, a foldable housing including a first housing, a second housing rotatably connected to one side of the first housing, a third housing rotatably connected to an opposite side of the first housing, and a recess, which faces at least a part of the first housing in a folded state, provided in a first end of a bezel area of the third housing, the recess being configured to accommodate the electronic pen when the electronic pen is inserted into the electronic device between the recess and the first housing, and a wireless charging module disposed in an interior space of the electronic device, the wireless charging module including a first coil member disposed to an edge of the second housing and connected to a first charging circuit, and a second coil member disposed to an edge of the third housing and connected to a second charging circuit, wherein the electronic pen comprises at least one third coil member connected to a third charging circuit inside the electronic pen, and wherein, when the electronic pen is mounted in the recess, the third coil member is disposed at a location at which the third coil member maintains an arrangement state in which the third coil member performs a wireless charging operation with the first coil member and/or the second coil member.

BRIEF DESCRIPTION OF THE DRAWINGS

The above and other aspects, features, and advantages of certain embodiments of the disclosure will be more apparent from the following detailed description, taken in conjunction with the accompanying drawings, in which.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions are omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus reference to "a component surface" includes reference to one or more of such surfaces.

Figure 1:
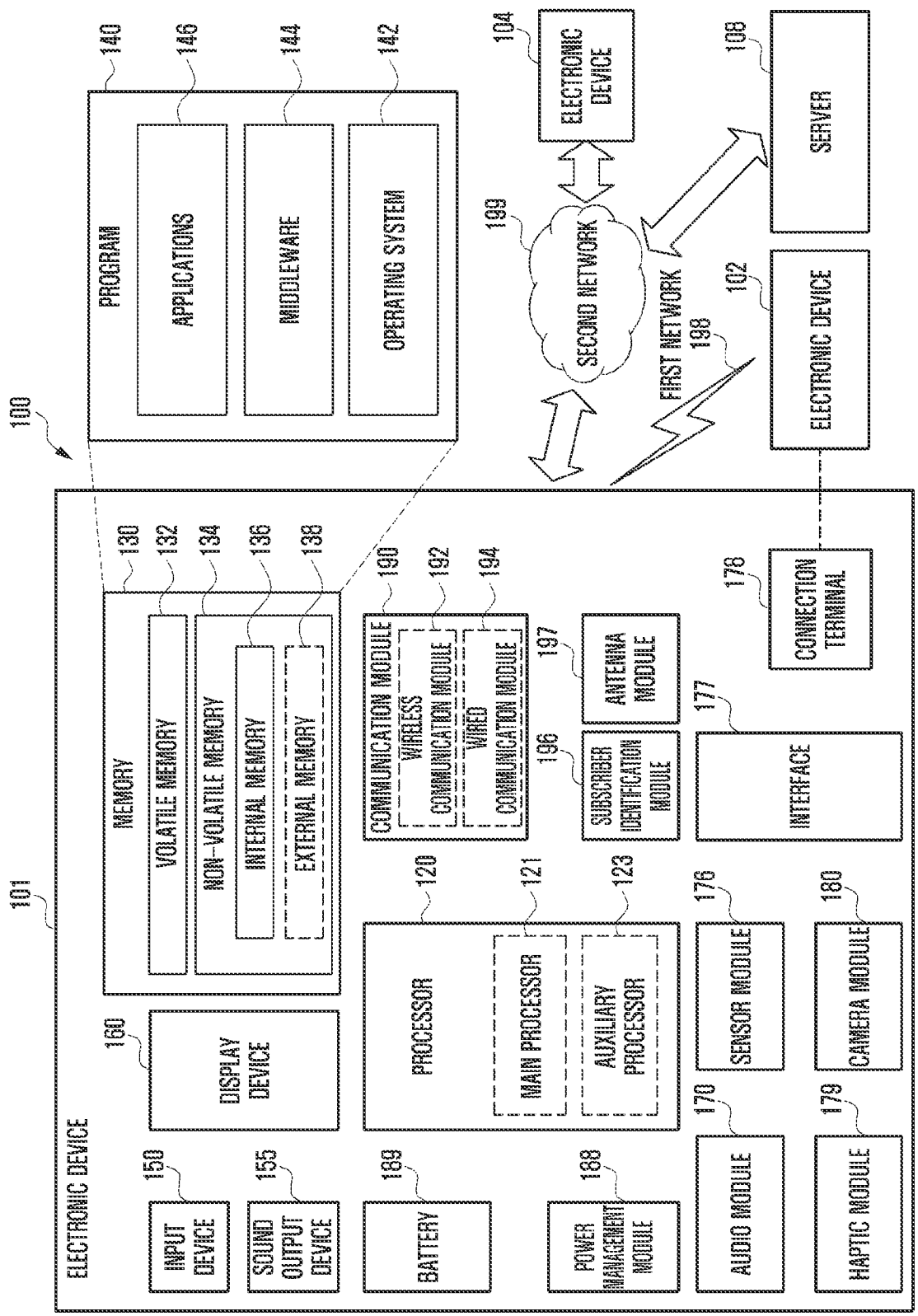
FIG. 1 illustrates an electronic device in a network environment according to an embodiment.

FIG. 1 illustrates an electronic device in a network environment according to an embodiment.

Referring to FIG. 1, an electronic device 101 in a network environment 100 may communicate with an electronic device 102 via a first network 198 (e.g., a short-range wireless communication network), or an electronic device 104 or a server 108 via a second network 199 (e.g., a long-range wireless communication network). The electronic device 101 may communicate with the electronic device 104 via the server 108. The electronic device 101 includes a processor 120, memory 130, an input device 150, an audio output device 155, a display device 160, an audio module 170, a sensor module 176, an interface 177, a haptic module 179, a camera module 180, a power management module 188, a battery 189, a communication module 190, a subscriber identity module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute software (e.g., a program 140) to control at least one other component (e.g., a hardware or software component) of the electronic device 101 coupled with the processor 120, and may perform various data processing or computation. As at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. The processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). The auxiliary processor 123 (e.g., an ISP or a CP) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include software (e.g., the program 140) and input data or output data for a command related thereto. The memory 130 may include the volatile memory 132 or the non-volatile memory 134. The non-volatile memory 134 may include an internal memory 136 or external memory 138.

The program 140 may be stored in the memory 130 as software, and may include an operating system (OS) 142, middleware 144, or an application 146.

The input device 150 may receive a command or data to be used by another component (e.g., the processor 120) of the electronic device 101, from the outside (e.g., a user) of the electronic device 101. The input device 150 may include a microphone, a mouse, a keyboard, or a digital pen (e.g., a stylus pen).

The audio output device 155 may output sound signals to the outside of the electronic device 101. The audio output device 155 may include a speaker or a receiver. The speaker may be used for general purposes, such as playing multimedia or playing record, and the receiver may be used for an incoming calls. The receiver may be implemented as separate from, or as part of the speaker.

The display device 160 may visually provide information to the outside (e.g., a user) of the electronic device 101. The display device 160 may include a display, a hologram device, or a projector and control circuitry to control a corresponding one of the display, hologram device, and projector. The display device 160 may include touch circuitry adapted to detect a touch, or sensor circuitry a pressure sensor) adapted to measure the intensity of force incurred by the touch.

The audio module 170 may convert a sound into an electrical signal and vice versa. The audio module 170 may obtain the sound via the input device 150, or output the sound via the audio output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. The sensor module 176 may include a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. The interface 177 may include a high definition multimedia interface (HDMI), a universal serial bus (USB) interface, a secure digital (SD) card interface, or an audio interface.

A connection terminal 178 may include a connector via which the electronic device 101 may be physically connected with the external electronic device the electronic device 102). The connection terminal 178 may include an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. The haptic module 179 may include a motor, a piezoelectric element, or an electric stimulator.

The camera module 180 may capture a still image or moving images. The camera module 180 may include one or more lenses, image sensors, image signal processors, or flashes.

The power management module 188 may manage power supplied to the electronic device 101. The power management module 188 may be implemented as at least part of a power management integrated circuit (PMIC).

The battery 189 may supply power to at least one component of the electronic device 101. The battery 189 may include a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the AP) and supports a direct (e.g., wired) communication or a wireless communication. The communication module 190 may include a wireless communication module 192 (e.g., a cellular communication module, a short-range wireless communication module, or a global navigation satellite system (ONSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or a standard of the Infrared Data Association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The antenna module 197 may transmit or receive a signal or power to or from the outside (e.g., the external electronic device) of the electronic device 101. The antenna module 197 may include an antenna including a radiating element composed of a conductive material or a conductive pattern formed in or on a substrate (e.g., a printed circuit board (PCB)). The antenna module 197 may include a plurality of antennas. In such a case, at least one antenna appropriate for a communication scheme used in the communication network, such as the first network 198 or the second network 199, may be selected by the communication module 190 (e.g., the wireless communication module 192) from the plurality of antennas. The signal or the power may then be transmitted or received between the communication module 190 and the external electronic device via the selected at least one antenna. Another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

Commands or data may be transmitted or received between the electronic device 101 and the external electronic device 104 via the server 108 coupled with the second network 199. Each of the electronic devices 102 and 104 may be a device of a same type as, or a different type, from the electronic device 101. All or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

An electronic device according to an embodiment may be one of various types of electronic devices. The electronic device may include a portable communication device (e.g., a smart phone), a computer device, a portable multimedia device, a portable medical device, a camera, a wearable device, or a home appliance. However, the electronic device is not limited to any of those described above.

Various embodiments of the disclosure and the terms used herein are not intended to limit the technological features set forth herein to particular embodiments and include various changes, equivalents, or replacements for a corresponding embodiment.

With regard to the description of the drawings, similar reference numerals may be used to refer to similar or related elements.

A singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases.

As used herein, such terms as "1st" and "2nd", or "first" and "second" may be used to simply distinguish a corresponding component from another, and does not limit the components in other aspect (e.g., importance or order). If an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

The term "module" may include a unit implemented in hardware, software, or firmware, and may interchangeably be used with other terms, for example, "logic", "logic block", "part", or "circuitry". A module may be a single integral component, or a minimum unit or part thereof adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

A method according to an embodiment of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™) or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

Each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

Figure 2A:
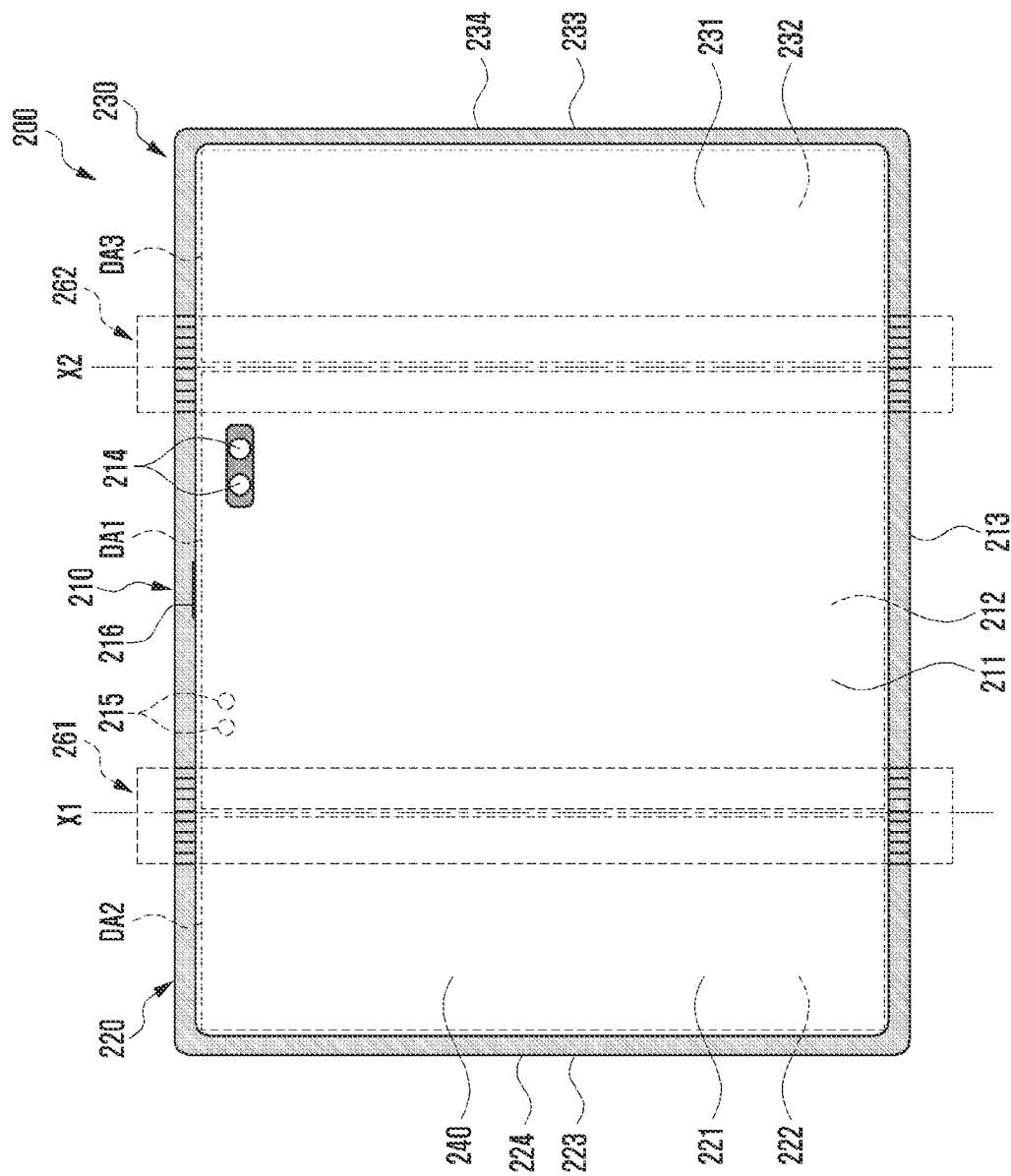
FIG. 2A illustrates a front surface of a foldable electronic device according to an embodiment.
Figure 2B:
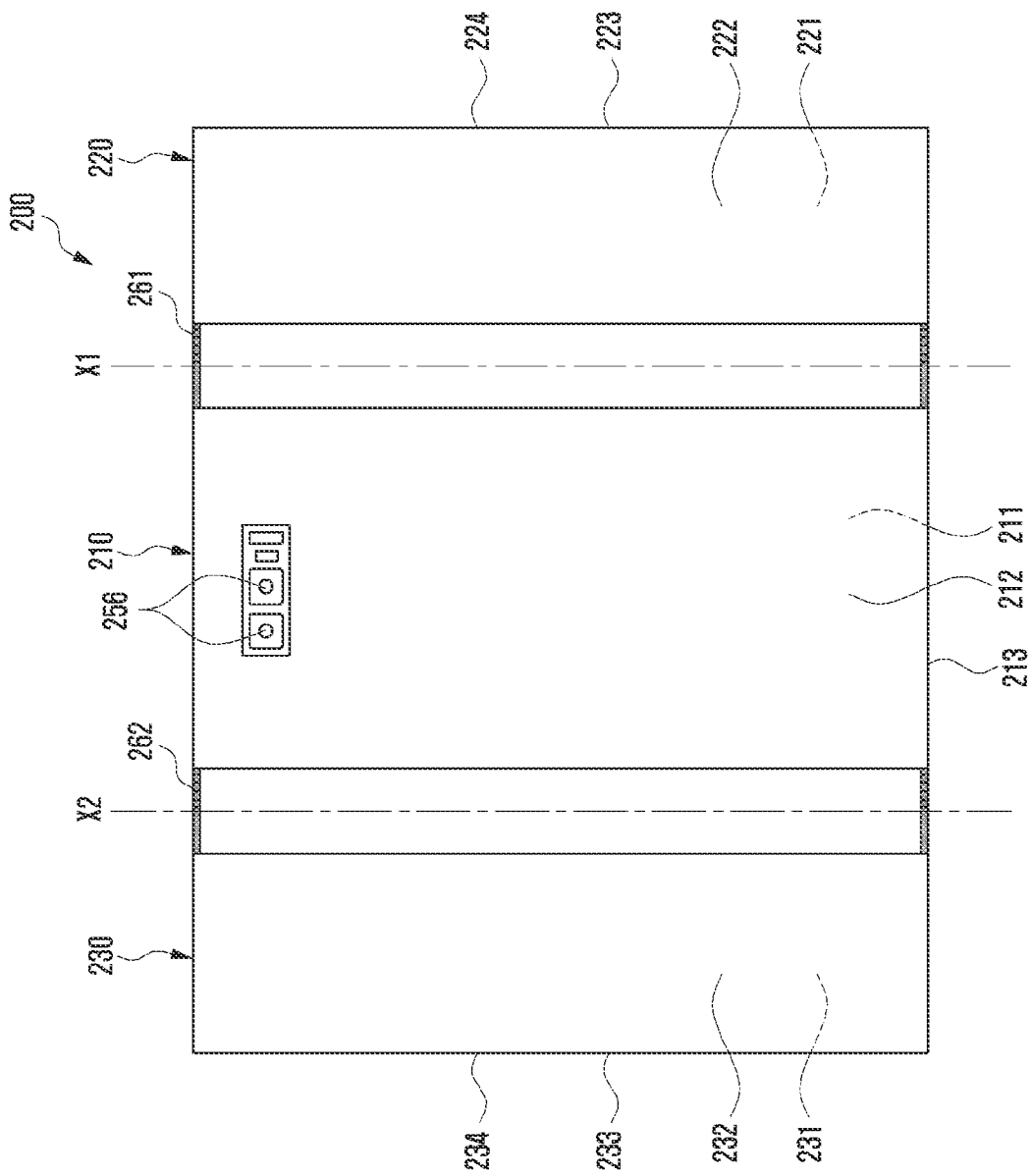
FIG. 2B illustrates a rear surface of a foldable electronic device according to an embodiment.

FIG. 2A illustrates a front surface of a foldable electronic device 200 according to an embodiment, and FIG. 2B illustrates a rear surface of a foldable electronic device 200 according to an embodiment.

The foldable electronic device 200 of FIGS. 2A and 2B may be partly similar to the electronic device 101 of FIG. 1 or may include other embodiments of an electronic device.

Referring to FIGS. 2A and 2B, an electronic device 200 (e.g., a multi-foldable electronic device) may include a first housing 210, a second housing 220, and a third housing 230 that are disposed to be rotated with respect to each other. The first housing 210 and the second housing 220 may be connected to each other to be rotatable with reference to a first axis X1 of rotation through a first hinge module 261. The first housing 210 and the third housing 230 may be connected to each other to be rotatable with reference to a second axis X2 of rotation through a second hinge module 262. For example, the second housing 220 may be coupled to one side of the first housing 210 through the first hinge module 261, and the third housing 230 may be coupled to an opposite side of the first housing 210 through the second hinge module 262.

The first housing 210 may include a first surface 211, a second surface 212 facing a direction that is opposite to the first surface 211, and a first side member 213 surrounding a first space between the first surface 211 and the second surface 212. The second housing 220 may include a third surface 221, a fourth surface 222 facing a direction that is opposite to the third surface 221, and a second side member 223 surrounding a second space between the third surface 221 and the fourth surface 222. The third housing 230 may include a fifth surface 231, a sixth surface 232 facing a direction that is opposite to the fifth surface 231, and a third side member 233 surrounding a third space between the fifth surface 231 and the sixth surface 232.

At least a portion of the first housing 210, the second housing 220, and/or the third housing 230 may be formed of a metallic material or a nonmetallic material having a selected strength to support the display 240. Portions facing the first surface 211, the third surface 221, and the fifth surface 231 of the first housing 210, the second housing 220, and/or the third housing 230 may be formed of a support plate (e.g., a support member or a support structure) for supporting the display 240. The first housing 210, the second housing 220, and/or the third housing 230 are formed of a metallic material, the side members 213, 223, and 233 may include conductive parts that are at least partially electrically isolated, and the isolated conductive parts are electrically connected to a wireless communication circuit and thus may be operated as at least one antenna (e.g., a legacy antenna) that is operated at a predetermined frequency band.

The second surface 212, the fourth surface 222, and the sixth surface 232 may include a rear cover which is formed of portions of the first housing 210, the second housing 220, and the third housing 230, or in which the first housing 210, the second housing 220, and the third housing 230 are structurally coupled to each other. The rear cover may be formed of coated or colored glass, ceramics, a polymer, a metal (e.g., aluminum, stainless steel (STS), or magnesium), or a combination of at least two thereof. As another embodiment, the electronic device 200 may further include a display that is additionally disposed on any one of the second surface 212, the fourth surface 222, or the sixth surface 232 according to a folding scheme.

When the foldable electronic device 200 is completely unfolded, the display 240 (e.g., the flexible display) may be disposed at up to at least a portion of the fifth surface 231 from the third surface 221 through the first surface 211. The display 240 may include a first display area DA1 facing the first housing 210, a second display area DA2 facing the second housing 220, and a third display area DA3 facing the third housing 230. The display areas DA1, DA2, and DA3 may be deformed such that the housings 210, 220, and 230 and the display 240 face each other or face opposite directions through rotational operations of the hinge modules 261 and 262.

The foldable electronic device 200 may include at least one electronic component that is disposed below at least a partial area of the display 240 or disposed to be exposed through an opening (e.g., a punch hole) provided in at least a portion of the display 240. The at least one electronic component may include at least one sensor module 215 that is disposed in at least one camera module 214 (e.g., a front camera module) exposed through the opening of the display 240 and/or on a rear surface of the display 240 to detect an external environment. The at least one camera module 214 may be disposed on the first display area DA1, or may be disposed in the second display area DA2 and/or the third display area DA3.

The at least one sensor module 215 may include at least one of a proximity sensor, an illumination sensor, an iris recognition sensor, an ultrasonic wave sensor, a fingerprint recognition sensor, a distance detection sensor (a time of flight (TOF) sensor), or an indicator. Alternatively, the at least one electronic component may be disposed in the second display area. DA2 and/or the third display area DA3. For example, the electronic device 200 is at least one sensor module 215, and may include two or more proximity sensors disposed in the first display area DA1 with reference to the first axis X1 of rotation. As another alternative, the proximity sensor may be disposed in the second display area DA2 and/or the third display area DA3. As another alternative, when the electronic device is operated in an out-folding scheme, one proximity sensor may be disposed in each of the first display area DA1, the second display area DA2, and the third display area DA3. The electronic device 200 may also include at least one proximity/illumination sensor that is disposed in a gap space while avoiding the pen accommodating part (e.g., the pen accommodating part 250 of FIG. 3) when a gap is present between the first edge 224 and the second edge 234 due to the pen accommodating part in the electronic device 200 during a folding operation. The electronic device 200 may include a receiver 216 disposed through at least a portion of the first housing 210. Alternatively, the receiver 216 may be disposed in the second housing 220 and/or the third housing 230. The receiver 216 may also include a piezoelectric speaker disposed under the display 240 in at least one of the first housing 210, the second housing 220, or the third housing 230. The foldable electronic device 200 may include an interface connector port, an ear jack hole, an external speaker module, an external card (a subscriber identity module (SIM) card, a universal subscriber identity module (UIM) card, or an secure digital (SD) card) tray, or at least one key button disposed through the first housing 210, the second housing 220, and/or the third housing 230. The foldable electronic device 200 may further include at least one camera module 256 disposed through the second surface 212 of the first housing 210 to be exposed to the outside in an unfolded state.

The foldable electronic device 200 may be disposed such that all of the display areas DA1, DA2, and DA3 are exposed to the outside in a folded state through a first folding scheme (e.g., the out-folding scheme). The foldable electronic device 200 may be disposed such that none of the display areas DA1, DA2, and DA3 is exposed to the outside in a folded state through a second folding scheme (e.g., the in-folding scheme). The foldable electronic device 200 may be disposed such that any one of the display areas DA1, DA2, and DA3 is disposed to the outside in a folded state through a complex folding scheme. The foldable electronic device 200 may include a pen accommodating part 250 that is disposed through the first edge 224 that is a portion of the second side member 223 of the second housing 220 and the second edge 234 that is a portion of the third side member 233 of the third housing 230, which are disposed to face each other in a folded state of the foldable electronic device 200 to accommodate an electronic pen FIG. 3 illustrates when an electronic pen 300 is disposed in the pen accommodating part 250 of the foldable electronic device 200 that is operated in the first folding scheme (e.g., the out-folding type) according to an embodiment.

Figure 3:
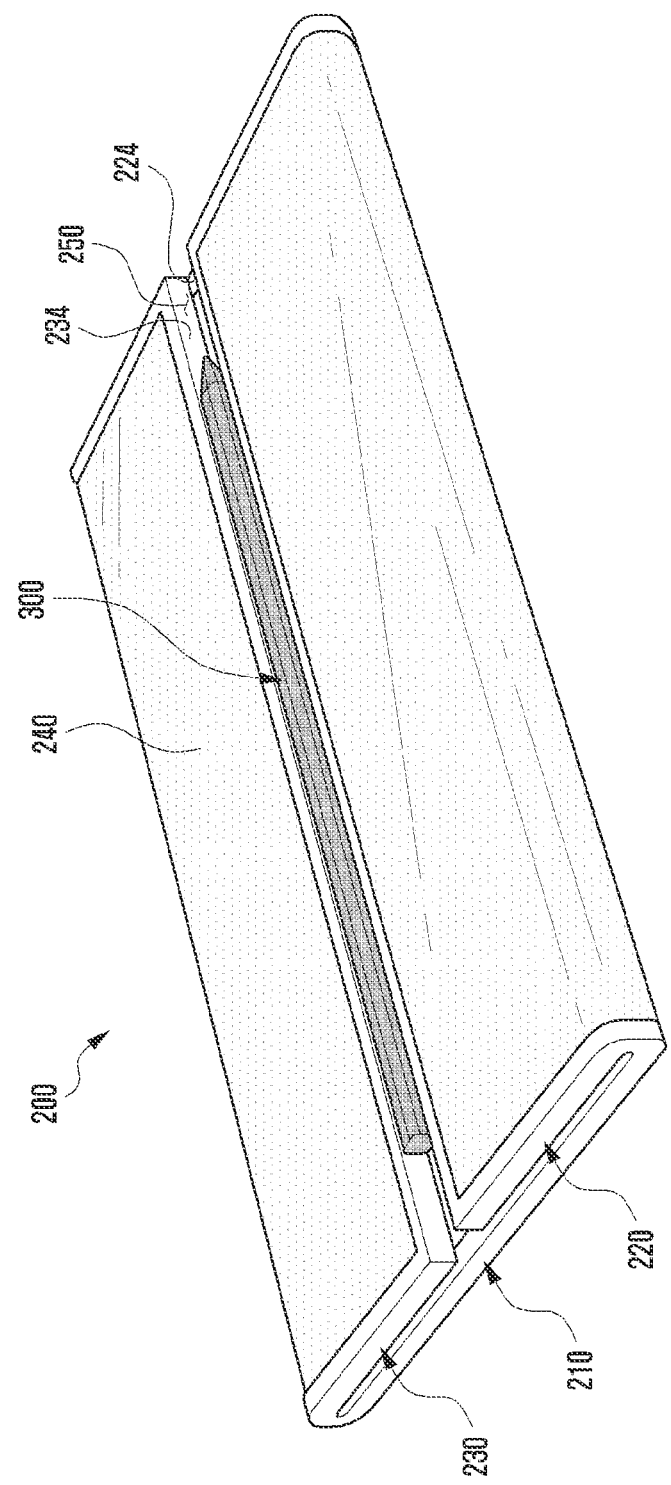
FIG. 3 illustrates when an electronic pen is disposed in a pen accommodating part of a foldable electronic device that is operated in a first folding scheme according to an embodiment.

Referring to FIG. 3, and with reference to elements in FIGS. 2A and 2B, in the folded state of the foldable electronic device 200, the second housing 220 may be operated such that a second display area DA2 faces a direction that is opposite to a portion of a first display area DA1, and the third housing 200 may be operated such that a third display area DA3 faces a direction that is opposite to a portion of the first display area DA1. The foldable electronic device 200 may be disposed such that the first edge 224 that is a portion of the second side member 223 of the second housing 220 and the second edge 234 that is a portion of the third side member 233 of the third housing 230 may face each other in the folded state of the foldable electronic device 200. The first edge 224 and the second edge 234 may be spaced apart from each other by a predetermined distance, and the spaced space may be applied to the pen accommodating part 250. Accordingly, the spaced distance d1 between the first edge 224 and the second edge 234 that define the pen accommodating part 250 may be determined according to the thickness or the outer diameter of the electronic pen 300.

The foldable electronic device 200 may include an electronic pen 300 disposed to be attached or detached through the pen accommodating part 250. When mounted in the pen accommodating part 250, the electronic pen 300 may correspond to an outer surface (e.g., the third surface 221 and/or the fourth surface 222 of the second housing 220 or the fifth surface 231 and/or the sixth surface 232 of the third housing 230) of the foldable electronic device 200 or may be disposed to be lower than the outer surface of the foldable electronic device 200. The electronic pen 300 may also be disposed to protrude at least partially farther than the foldable electronic device 200 in the pen accommodating part 250.

Figure 4A:
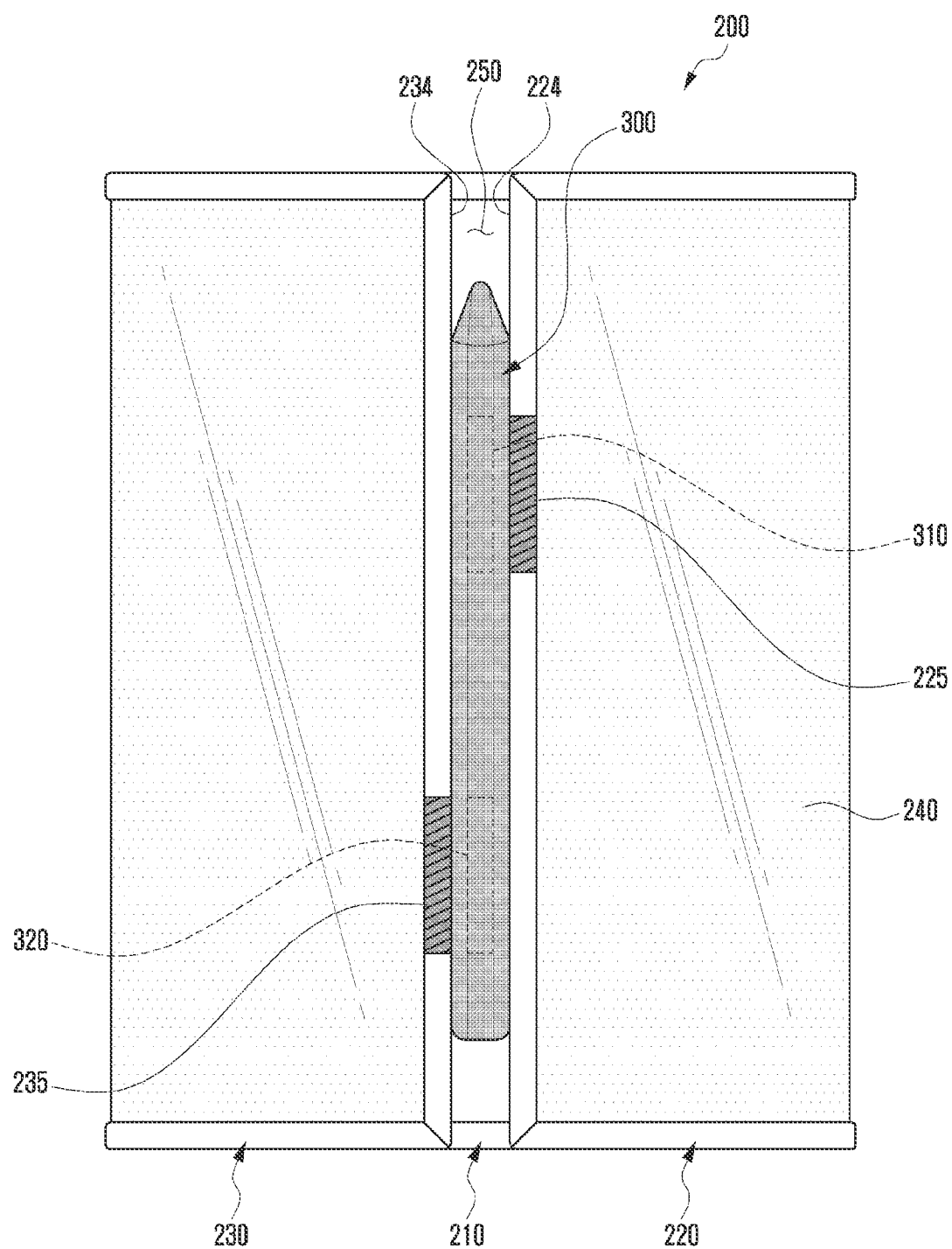
FIG. 4A illustrates an internal configuration of a foldable electronic device when an electronic pen is disposed in a pen accommodating part according to an embodiment.
Figure 4B:
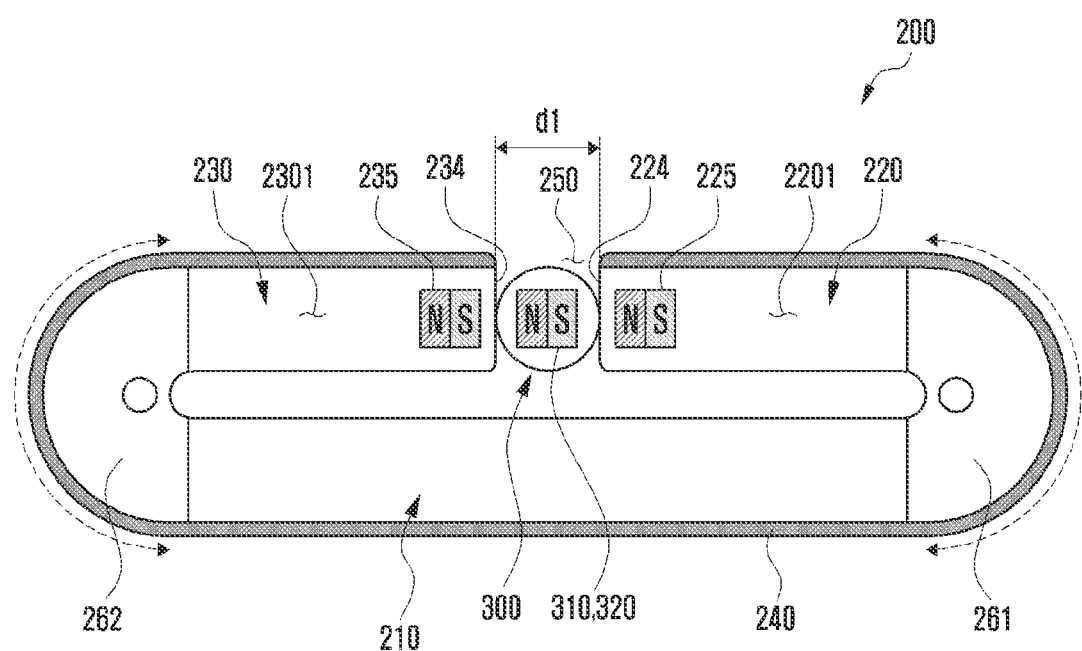
FIG. 4B is a partially cross-sectional view illustrating an internal configuration of a foldable electronic device when an electronic pen is disposed in a pen accommodating part according to an embodiment.

FIG. 4A illustrates an internal configuration of a foldable electronic device 200 when an electronic pen 300 is disposed in a pen accommodating part 250 according to an embodiment, and FIG. 4B is a partially cross-sectional view illustrating an internal configuration of a foldable electronic device 200 when an electronic pen 300 is disposed in a pen accommodating part 250 according to an embodiment.

Referring to FIGS. 4A and 4B, a foldable electronic device 200 may provide a fixing structure for fixing the location of the electronic pen 300 such that any unintentional movement of the electronic pen 300 disposed in the pen accommodating part 250 is prevented. The foldable electronic device 200 may include a first magnetic force generating member 225 disposed around the first edge 224 in an interior space 2201 of the second housing 220, and a second magnetic force generating member 235 disposed around the second edge 234 in an interior space 2301 of the third housing 230. Each of the magnetic force generating members 225 and 235 may include a magnet.

The electronic pen 300 may include a first magnetic force reaction member 310 disposed in a location where the first magnetic force reaction member 310 is affected by a magnetic force of the first magnetic force generating member 225 when the electronic pen is disposed in the pen accommodating part 250 and a second magnetic force reaction member 320 disposed at a location at which the second magnetic force reaction member 320 is affected by a magnetic force of the second magnetic force generating member 235 in an interior space thereof. Each of the first magnetic force reaction member 310 and the second magnetic force reaction member 320 may include an iron piece or a magnet that reacts with the magnetic force of the magnetic force generating members 225 and 235. When being formed of a magnet, the first magnetic force reaction member 310 and the second magnetic force reaction member 320 may be disposed in consideration of arrangement of polarities which applies attractive forces with the magnets used for the first magnetic force generating member 225 and the second magnetic force generating member 235.

The electronic pen 300 may be firmly fixed to the pen accommodating part 250 by disposing the first magnetic force generating member 225 and the second magnetic force generating member 235 at locations that are symmetrical to each other in inclined directions with respect to the pen accommodating part 250. The magnetic force generating members may be disposed at locations of the first edge and the second edge, which face each other. One or more magnetic force generating members may be disposed in any one of the first edge 224 or the second edge 234. Four or more magnetic force generating members and four or more magnetic force reaction members may be disposed. In this case, two magnetic force generating members that are spaced apart from each other by a predetermined distance may be disposed in each of the edges 224 and 234.

Each of the first magnetic force generating member 225 and the second magnetic force generating member 235 may include an electromagnet that generates a magnetic force as a selective voltage is applied to the electromagnet. Each of the first magnetic force reaction member 310 and the second magnetic force reaction member 320 may include a magnet, and when it is necessary to separate the electronic pen 300 from the pen accommodating part 250, the electronic pen 300 may be pushed to the outside through a repulsive force against the magnet, which is generated as a voltage is applied to the electromagnet through an external input (e.g., a key button). In contrast, when the electronic pen 300 is mounted in the pen accommodating part 250, the attachment state of the electronic pen 300 to the pen accommodating part 250 may be maintained by an attractive force, by which the iron core of the electromagnet is pulled by the magnetic force of the magnet by interrupting the power of the electromagnet.

Figure 4C:
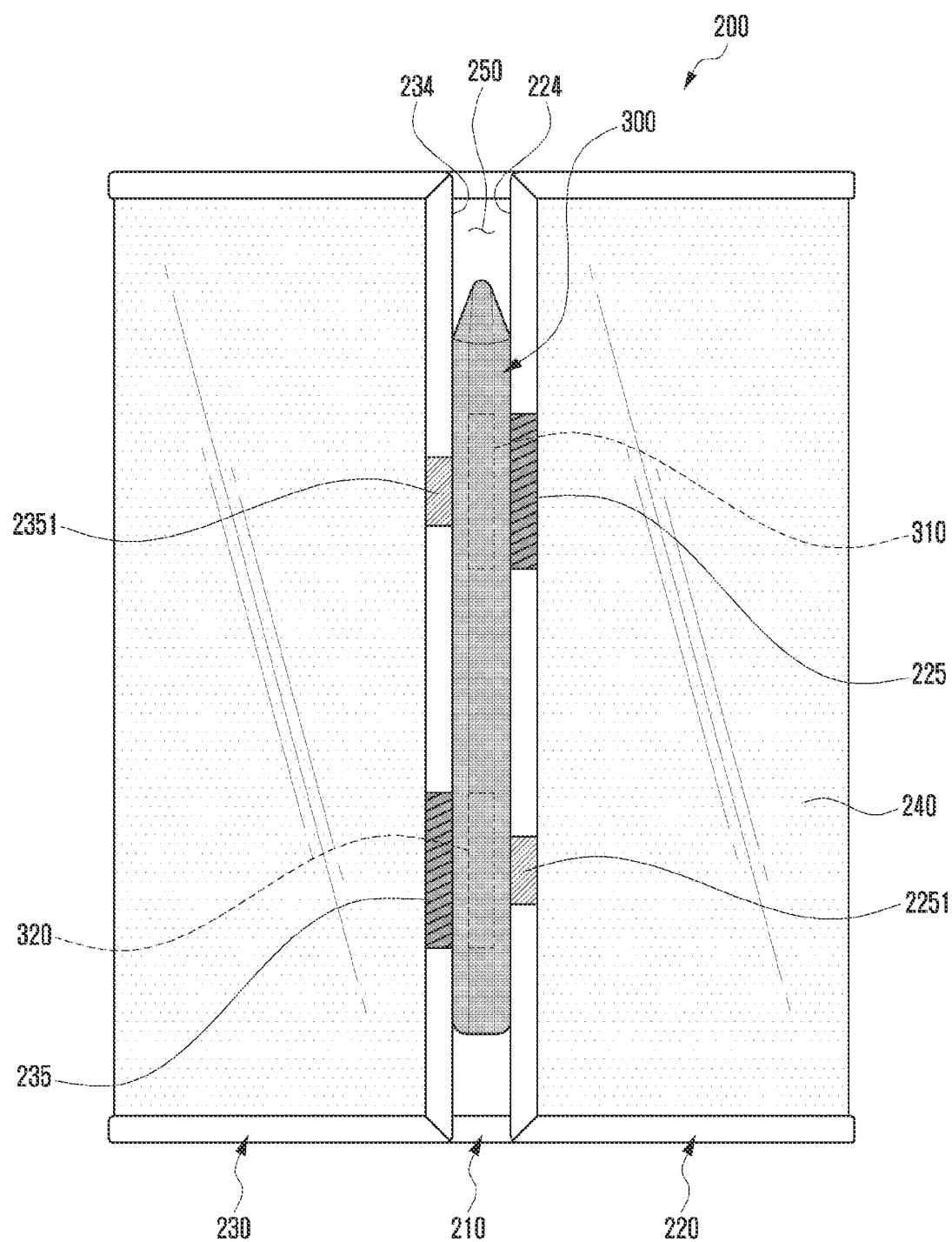
FIG. 4C illustrates a configuration of a foldable electronic device according to an embodiment.

FIG. 4C illustrates a configuration of a foldable electronic device 200 according to an embodiment.

Referring to FIG. 4C, the foldable electronic device 200 may include a first magnetic force detecting sensor 2251 disposed in the first edge 224 of the second housing 220 to face the second magnetic force generating member 235 disposed in the second edge 234 of the third housing 230 in the folded state of the foldable electronic device 200, and a second magnetic force detecting sensor 2351 disposed in the second edge 234 of the third housing 230 to face the first magnetic force generating member 225 disposed in the first edge 224 of the second housing 220. Each of the first magnetic force detecting sensor 2251 and the second magnetic force detecting sensor 2351 may include a Hall sensor.

The electronic device 200 may detect a folding operation of the electronic device 200 through the first magnetic force detecting sensor 2251 and the second magnetic force detecting sensor 2351. The electronic device 200 may detect a mounting state of the electronic pen 300 accommodated in the pen accommodating part 250 through the first magnetic force detecting sensor 2251 and the second magnetic force detecting sensor 2351. For example, even though any one of the magnetic force detecting sensors 2251 and 2351 detects another magnetic force in the unfolded state of the electronic device 200, a folding operation error can be prevented through the remaining magnetic force detecting sensors.

Figure 5:
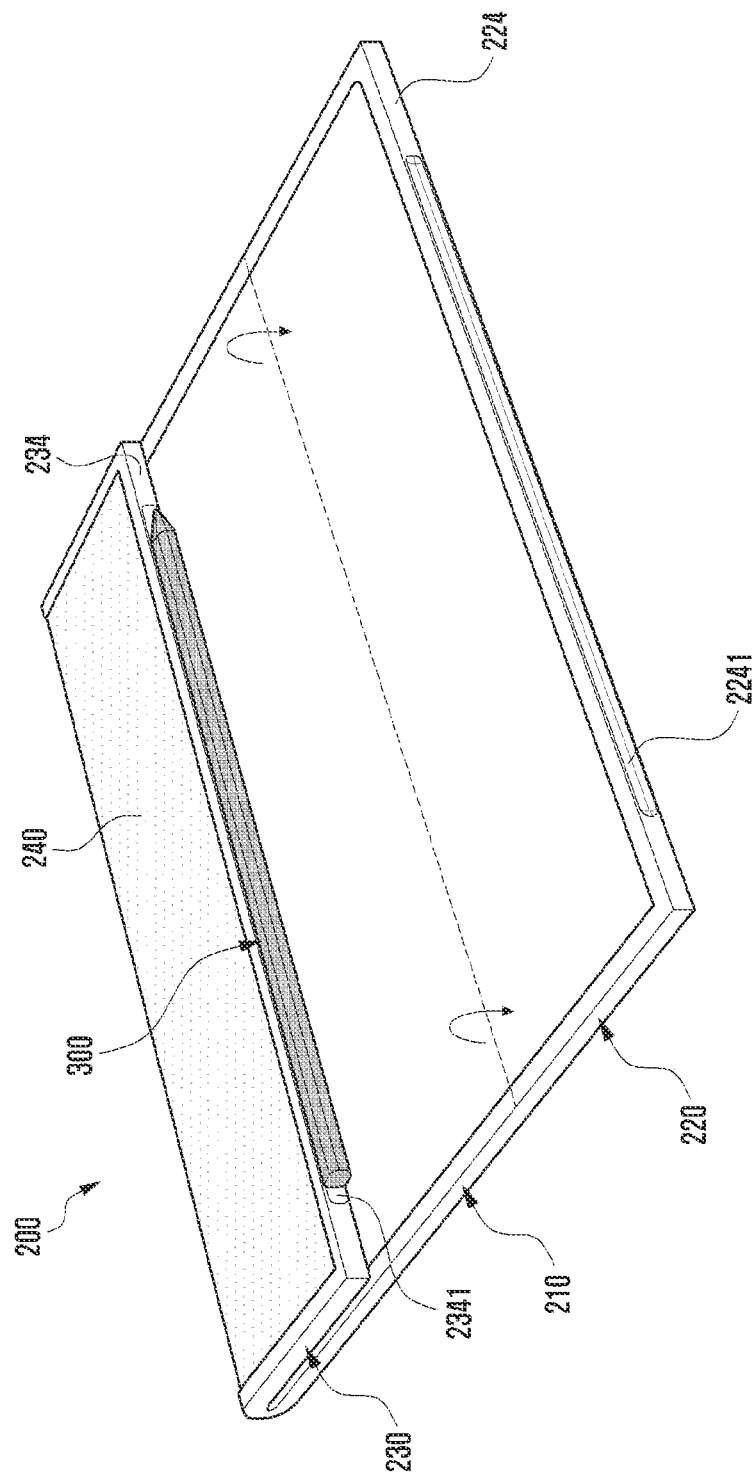
FIG. 5 illustrates when an electronic pen is disposed in a pen accommodating part of a foldable electronic device according to an embodiment.
Figure 6A:
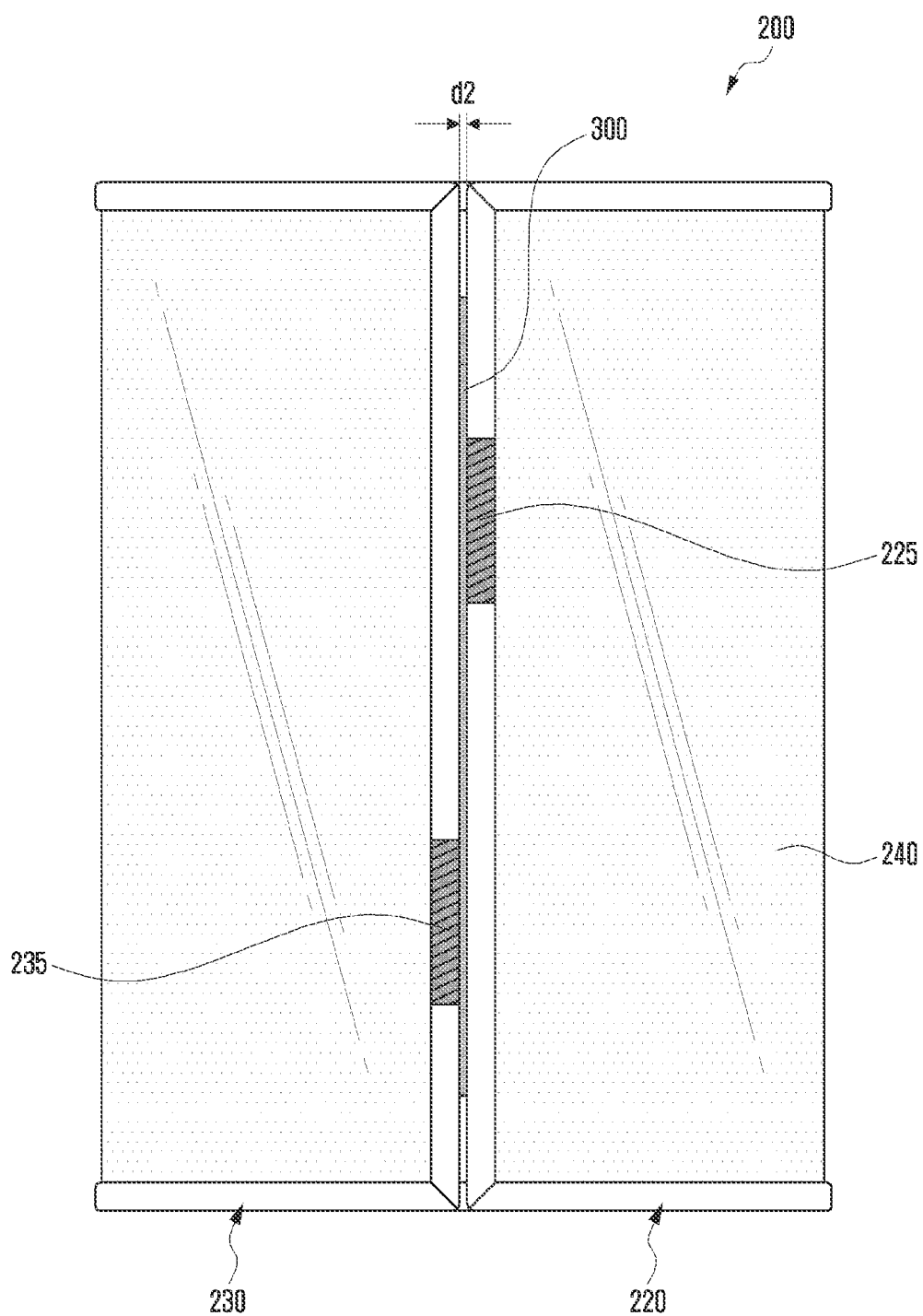
FIG. 6A illustrates a foldable electronic device when a display is viewed from the top in a folded state of the foldable electronic device according to an embodiment.
Figure 6B:
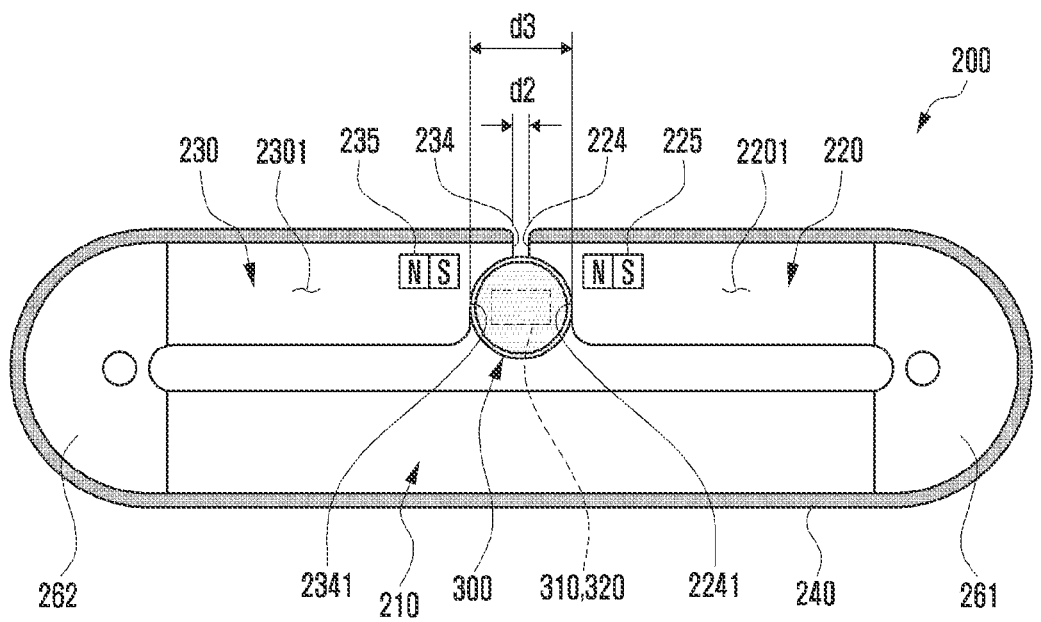
FIG. 6B is a partially cross-sectional view illustrating an operational state of a foldable electronic device according to an embodiment.
Figure 6B:
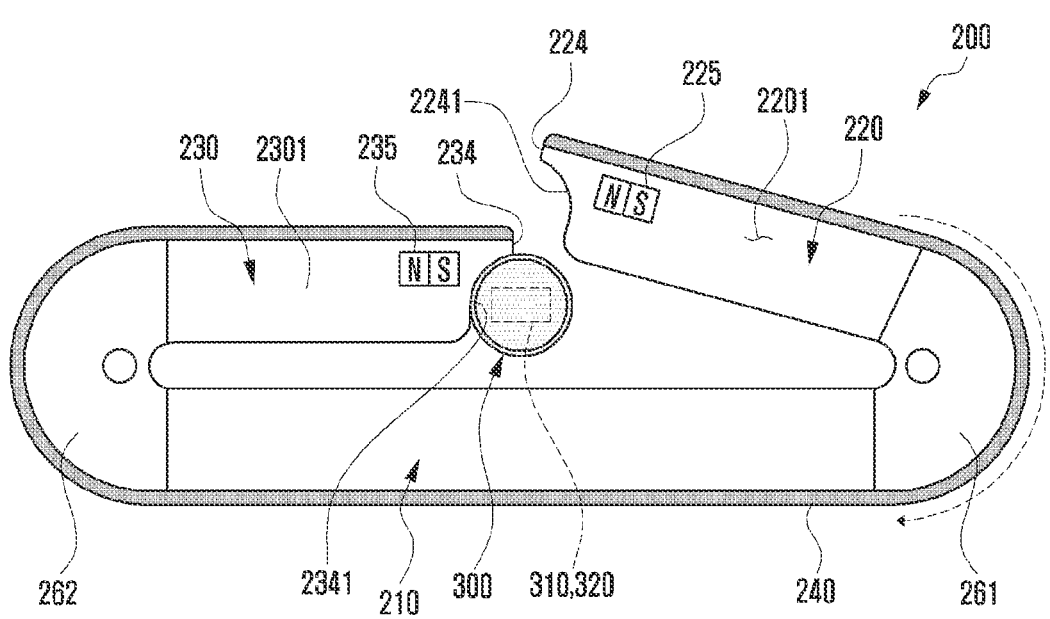

FIG. 5 illustrates when an electronic pen 300 is disposed in the pen accommodating part 250 of the foldable electronic device 200 according to an embodiment. FIG. 6A illustrates a foldable electronic device when a display is viewed from the top in a folded state of the foldable electronic device according to an embodiment. FIG. 6B is a partially cross-sectional view illustrating an operational state of a foldable electronic device 200 according to an embodiment.

Referring to FIGS. 5, 6A, and 6B, a foldable electronic device 200 may include a first recess 2241 disposed in the first edge 224 of the second housing 220, and a second recess 2341 disposed in the second edge 234 of the third housing 230. The electronic pen 300 may maintain an attachment state in the pen accommodating part 250 through the structural shapes of the first recess 2241 and the second recess 2341, in addition to the magnetic forces. The first recess 2241 may be lower than an outer surface of the first edge 224, and may have a shape and a length by which at least a portion of the outer surface of the electronic pen 300 may be accommodated. Similarly, the second recess 2341 may be lower than an outer surface of the second edge 234, and may have a shape and a length by which at least a portion of the outer surface of the electronic pen 300 may be accommodated. The first recess 2241 and the second recess 2341 may have a longer length than the length of the electronic pen 300. The first recess 2241 and the second recess 2341 may be formed of a material that is different from the material of the second side member 223 and the third side member 233. For example, the second side member 223 and the third side member 233 may be formed of a metallic member, and the first recess 2241 and the second recess 2341 may be formed of a polymer that is injection-molded in the metallic member. Alternatively, the first recess 2241 and the second recess 2341 may be disposed to have a color that is different from the colors of the surroundings to enhance visibility for secure mounting of the electronic pen 300 and an appealing design.

The first recess 2241 and the second recess 2341 may be disposed such that the distance d2 between the first edge 224 and the second edge 234 at a location that is near the display is less than the distance d3 between the first edge 224 and the second edge 234 at a location that is far from the display 240, in the folded state of the electronic device. The first recess 2241 and the second recess 2341 may be disposed such that the distance between the first edge 224 and the second edge 234 gradually increases as the distance from the display 240 increases. Through the shapes of the recesses 2241 and 2341, a gap between the two housings 220 and 230 is minimized at the part of the display 240, and a size by which the electronic pen 300 may be smoothly accommodated may be provided at an opposite part of the display 240.

The foldable electronic device 200 may maintain the attachment state of the electronic pen 300 in correspondence to the partially folded state of the foldable electronic device 200 through the first recess 2241 and the second recess 2341.

As illustrated in FIG. 5, the electronic pen 300 may maintain the attachment state through the second recess 2341 of the second edge 234 even though the foldable electronic device 200 is in the partially folded state in which the third housing 230 maintains the folded state and the second housing 220 is unfolded. In this case, the electronic pen 300 may maintain the attachment state in the second recess 2341 through an attractive force between the second magnetic force generating member 235 disposed in the interior space 2301 of the third housing 230 and the second magnetic force reaction member 320 of the electronic pen 300. In another embodiment, when only the third housing 230 is unfolded, the electronic pen 300 may maintain the attachment state in the first recess 2241 through an attractive force between the first magnetic force generating member 225 disposed in the interior space 2201 of the second housing 220 and the first magnetic force reaction member 310 of the electronic pen 300.

Since the distance d2 between the first edge 224 and the second edge 234 may further decrease through the first recess 2241 and the second recess 2341 and the electronic pen 300 may be accommodated through the recesses 2241 and 2341, the separation of the electronic pen 300 can be prevented and the coupling force of the electronic pen 300 can be further reinforced in the folded state of the foldable electronic device 200 through the first recess 2241 and/or the second recess 2341. Because the electronic pen 300 is separated from the first recess 2241 and remains in the second recess 2341 through the structural shape of the second recess 2341 disposed in the third housing 230 when only the second housing 220 is unfolded, unintentional separation of the electronic pen 300 from the pen accommodating part 250 can be prevented.

Figure 7:
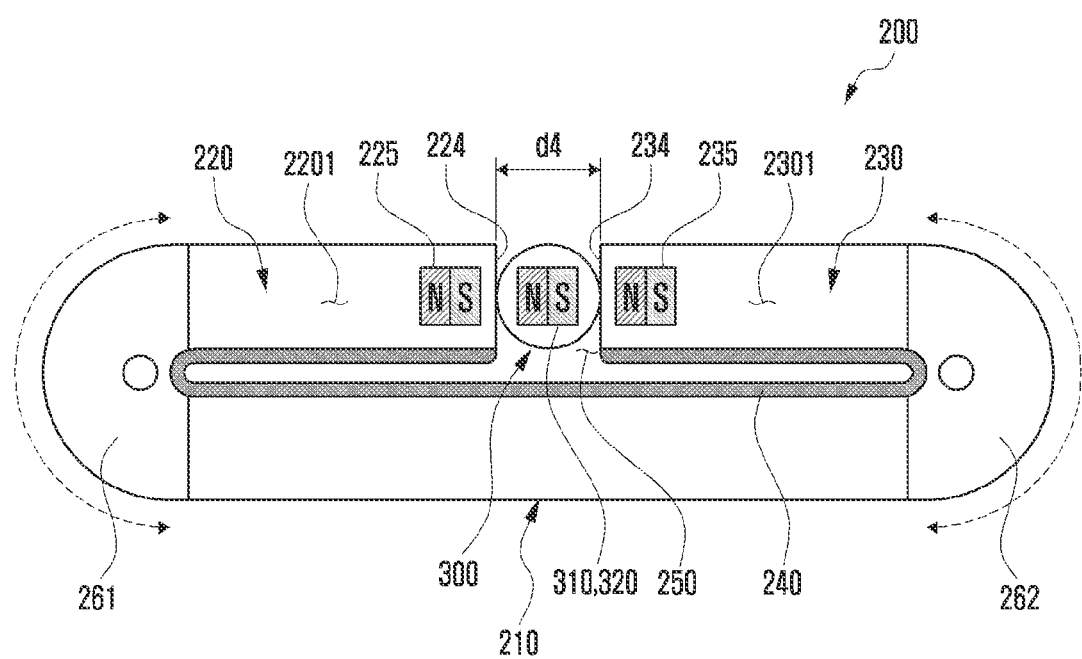
FIG. 7 is a partially cross-sectional view illustrating an internal configuration of a foldable electronic device according to an embodiment.

FIG. 7 is a partially cross-sectional view illustrating a configuration of a foldable electronic device 200 according to an embodiment.

Referring to FIG. 7, the foldable electronic device 200 may have a configuration that is substantially the same as the foldable electronic device of FIGS. 2A and 2B, and may be folded in the second folding scheme (e.g., an in-folding scheme) through the first hinge module 261 and the second hinge module 262.

Referring to FIG. 7, in the folded state of the foldable electronic device 200, the second housing 220 may be operated such that the second display area DA2 faces a portion of the first display area DA1 and the third housing 200 may be operated such that the third display area DA3 faces a portion of the first display area DA1.

The foldable electronic device 200 may be disposed such that the first edge 224 that is a portion of the second side member 223 of the second housing 220 and the second edge 234 that is a portion of the third side member 233 of the third housing 230 may face each other in the folded state of the foldable electronic device 200. The first edge 224 and the second edge 234 may be spaced apart from each other by a predetermined distance d4, and the pace may be applied to the pen accommodating part 250. As described above, the foldable electronic device 200 may accommodate the electronic pen 300 in the pen accommodating part 250 through the first magnetic force generating member 225, the second magnetic force generating member 235, the first magnetic force reaction member 310, and the second magnetic force reaction member 320.

Figure 8:
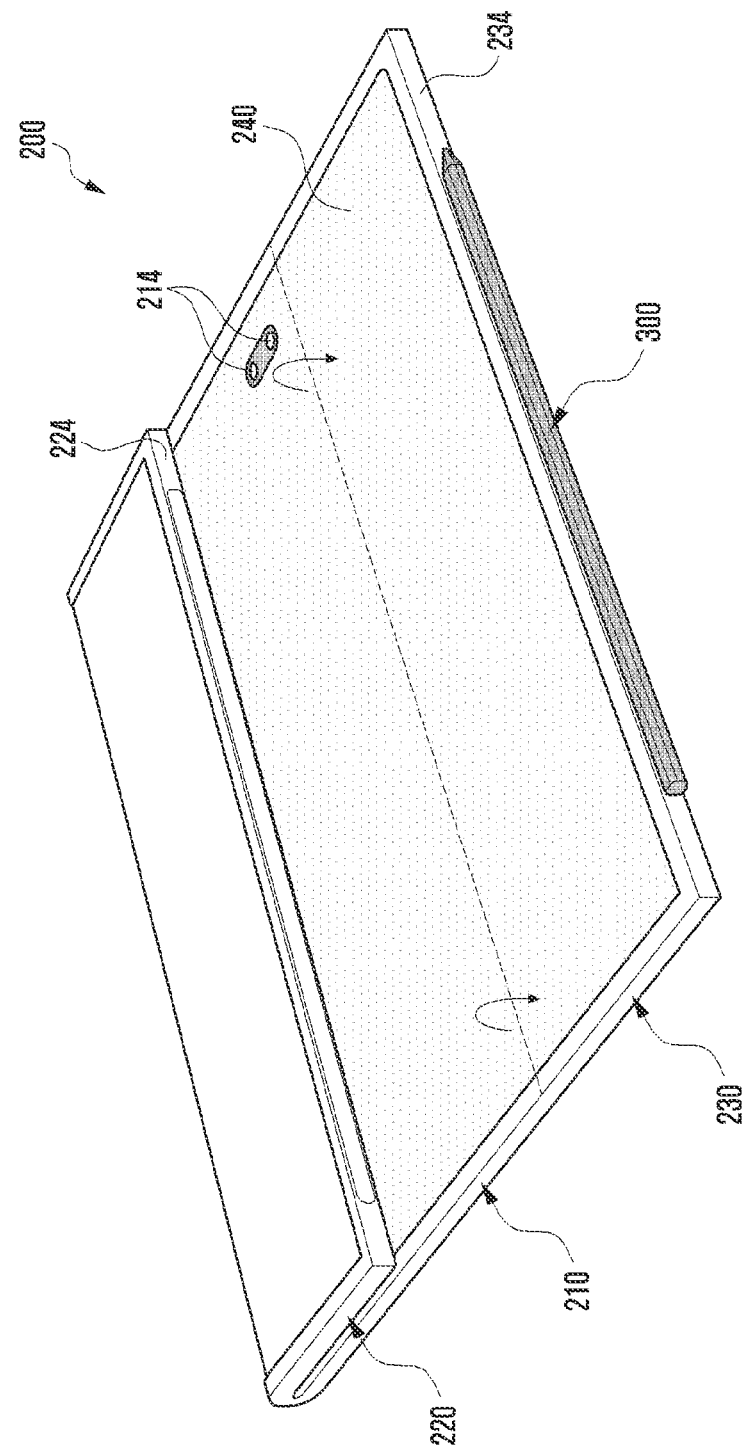
FIG. 8 illustrates when an electronic pen is disposed in a pen accommodating part of a foldable electronic device according to an embodiment.
Figure 9:
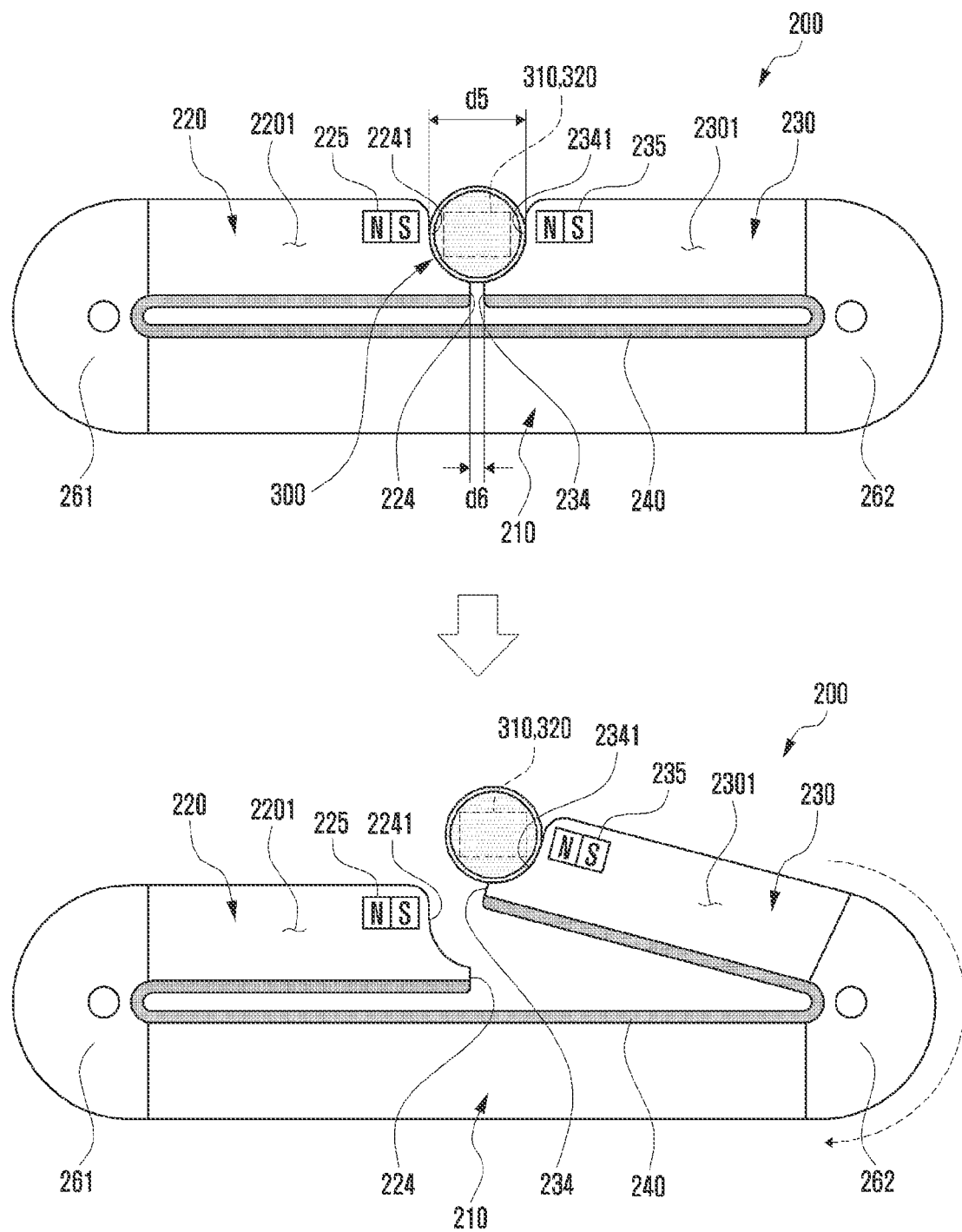
FIG. 9 is a partially cross-sectional view illustrating an operational state of a foldable electronic device according to an embodiment.

FIG. 8 illustrates when an electronic pen is disposed in a pen accommodating part of a foldable electronic device according to an embodiment. FIG. 9 is a partially cross-sectional view illustrating an operational state of a foldable electronic device according to an embodiment.

Referring to FIGS. 8 and 9, through the second folding scheme, a distance d5 of the pen accommodating part 250 between the first edge 224 and the second edge 234 of the first recess 2241 and the second recess 2341 may be further widened. For example, the distance d5 of the pen accommodating part 250 may have a size by which at least the electronic pen 300 may be accommodated from the outside in the folded state.

The first recess 2241 and the second recess 2341 may be disposed such that the distance d5 between the first edge 224 and the second edge 234 at a location that is far from the display is larger than the distance d6 between the first edge 224 and the second edge 234 at a location that is near the display 240, in the folded state of the electronic device. For example, the first recess 2241 and the second recess 2341 may be disposed such that the distance between the first edge 224 and the second edge 234 gradually increases as the distance from the display 240 increases. Through the shapes of the recesses 2241 and 2341, a gap between the two housings 220 and 230 is minimized at the part of the display 240, and a size by which the electronic pen 300 may be smoothly accommodated may be provided at an opposite pair of the display 240.

As described above, the foldable electronic device 200 has a structure in which separation of the electronic pen 300 may be prevented through the first recess 2241 and/or the second recess 2341, in the folded state. For example, because the electronic pen 300 is joined to the first recess 2241 while being attached to the second recess 2341 disposed in the third housing 230 and is separated only from the first recess 2241 when only the third housing 230 is unfolded, the electronic pen 300 is prevented from being unintentionally separated from the foldable electronic device 200.

Figure 10A:
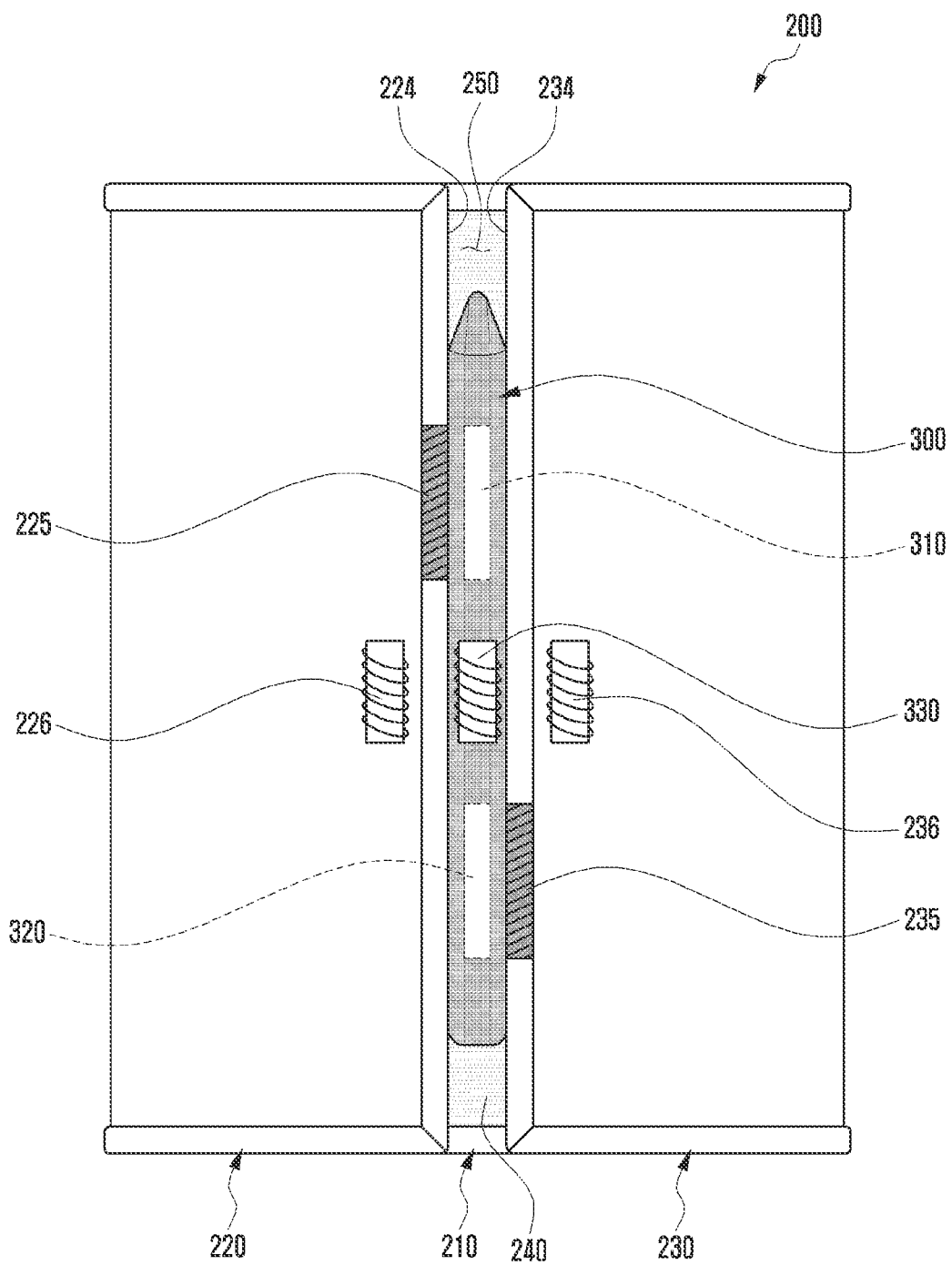
FIG. 10A illustrates a foldable electronic device having a wireless charging structure according to an embodiment.
Figure 10B:
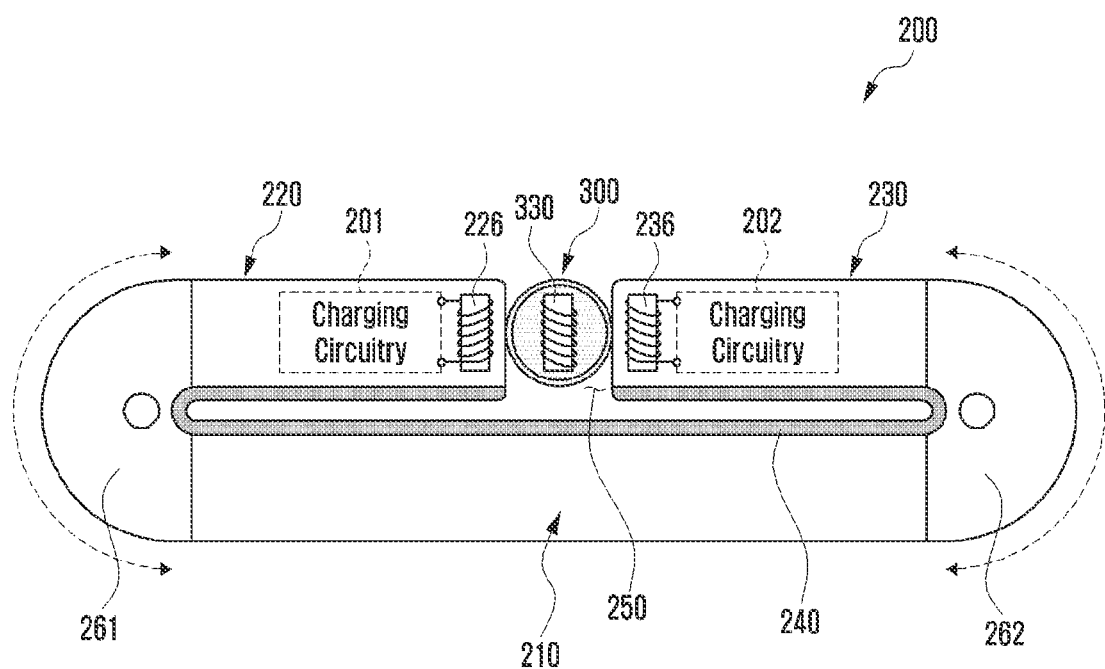
FIG. 10B is a partially sectional view of a foldable electronic device having a wireless charging structure according to an embodiment.

FIG. 10A illustrates a foldable electronic device 200 having a wireless charging structure according to an embodiment, and FIG. 10B is a partially sectional view of a foldable electronic device 200 having a wireless charging structure according to an embodiment.

Referring to FIGS. 10A and 10B, a foldable electronic device 200 may have a charging structure for charging a battery included in the electronic pen 300. The foldable electronic device 200 may include a first coil member 226 disposed around the first edge 224 of the second housing 220, and a second coil member 236 disposed around the second edge 234 of the third housing 230. The first coil member 226 may be electrically connected to a first charging circuitry 201 disposed in the foldable electronic device 200. The second coil member 236 may be electrically connected to a second charging circuitry 202 disposed in the foldable electronic device 202. Each of the first coil member 226 and the second coil member 236 may include a coil member for wireless power transmission and may be independently operated through the first charging circuitry 201 and the second charging circuitry 202. Because the batteries may be independently disposed for the housings 220 and 230 through independent arrangements of the charging circuits, power loss by lines can be minimized by separating the charging circuitries and minimizing the lengths of the power lines between the batteries and the charging circuits. Alternatively, the first coil member 226 and the second coil member 236 may be controlled together through one charging circuit. The charging circuitry may be disposed in any of the housings.

The electronic pen 300 may include a third coil member 330 disposed at a location for receiving wireless power between the first coil member 226 and the second coil member 236 when the electronic pen 300 is disposed in the pen accommodating part 250. The third coil member 330 may include a coil member for wireless power reception. The third coil member 330 may be disposed at a location at which the third coil member 330 may be arranged with the first coil member 226 and/or the second coil member 236 side by side such that the third coil member 330 may perform wireless charging with the first coil member 226 and/or the second coil member 236 through the above-described fixing structure of the magnetic force generating members 225 and 235 and the magnetic force reaction members 310 and 320.

Each of the first coil member 226, the second coil member 236, and the third coil member 330 may include a solenoid type coil, or may include a flat plate type coil of flexible printed circuit board (FPCB) type. In another embodiment, the third coil member may include a solenoid type coil, and each of the first coil member 226 and the second coil member 236 may include a flat plate type coil of an FPCB type. For example, it may be important for the first coil member 226, the second coil member 236, and the third coil member 330 to be disposed at locations where the third coil member 330 may be arranged with the first coil member 226 and/or the second coil member 236 side by side such that the third coil member 330 may perform wireless charging with the first coil member 226 and/or the second coil member 236 through the above-described fixing structure of the magnetic force generating members 225 and 235 and the magnetic force reaction members 310 and 320 when the electronic pen 300 is accommodated in the pen accommodating part 250.

The electronic device 200 may include a charging coil member disposed in the first edge 224 of the second housing 220 or the second edge 234 of the third housing 230. The electronic device 200 may induce a user to accommodate the electronic pen in the corresponding edge ley displaying a charging alarm on the display around the edge, in which the coil member is located, when the electronic pen 300 is accommodated in the pen accommodating part or when the remaining battery power of the electronic pen is low. At least one magnetic force generating member 225 or 235 may be disposed in the edge in which the charging coil is present.

Figure 11:
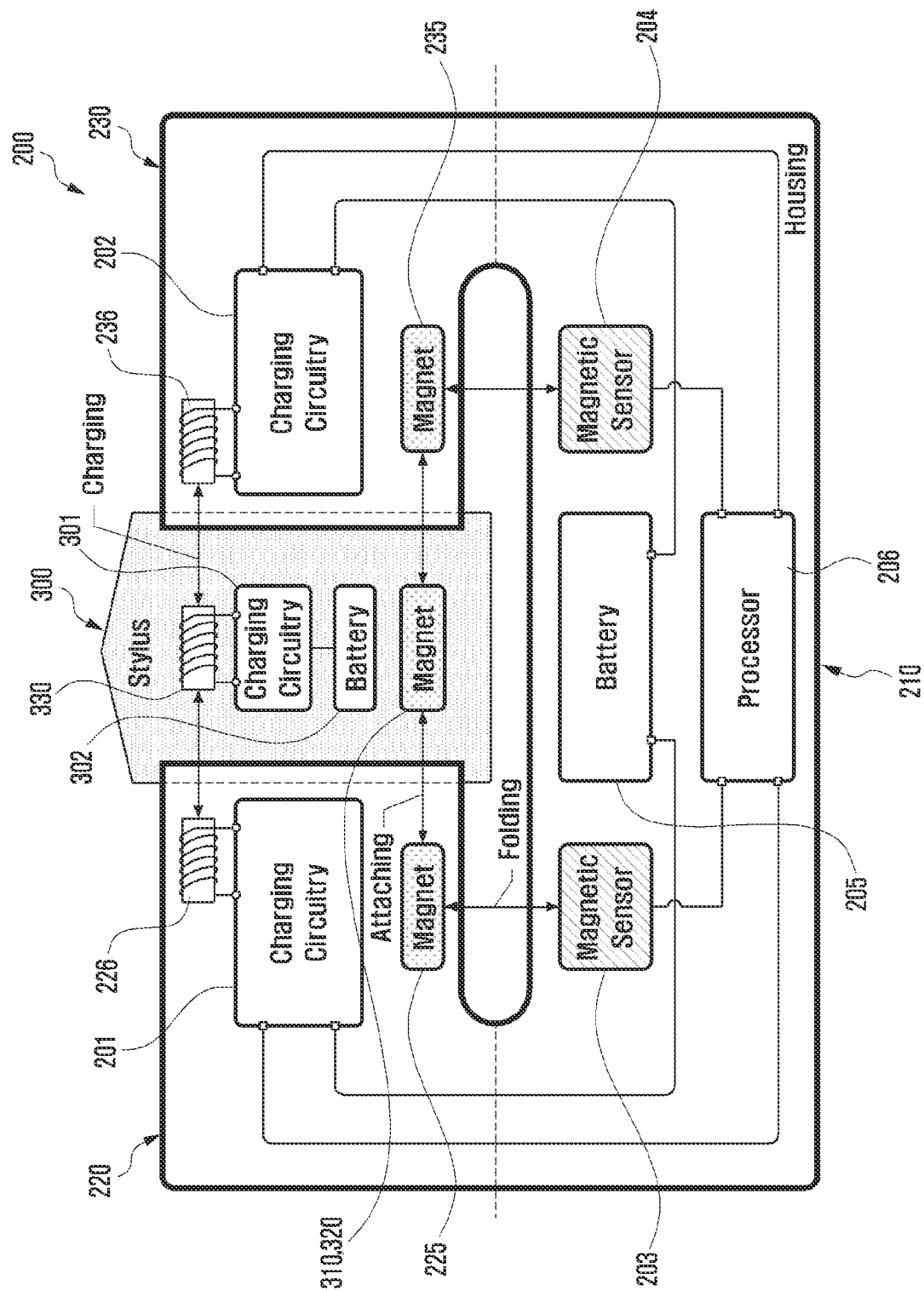
FIG. 11 illustrates a block diagram of an electronic device for wireless charging of an electronic pen according to an embodiment.

FIG. 11 illustrates a block diagram of a foldable electronic device 200 for wireless charging of an electronic pen 300 according to an embodiment.

Referring to FIG. 11, the foldable electronic device 200 may include a battery 205 disposed in the first housing 210, a first magnetic force detecting sensor 203 configured to detect a magnetic force of the first magnetic force generating member 225 disposed in the second housing 220 in the folded state of the foldable electronic device 200, a second magnetic force detecting sensor 203 (e.g., a Hall sensor) configured to detect a magnetic force of the second magnetic force generating member 235 disposed in the third housing 220, and at least one processor 206 configured to receive folding state information of the second housing 220 and/or the third housing 230 based on sensing information of the first magnetic force detecting sensor 203 and the second magnetic force detecting sensor 204. The battery 205 may be individually disposed in the second housing 220 and/or the third housing 230 in parallel. The processor 206 may detect the folding state of the second housing 220 and/or the third housing according to the sensing information of the first magnetic force detecting sensor 203 and/or the second magnetic force detecting sensor 204. The electronic device 200 may detect the folding state through another sensor (e.g., a gyro sensor or an illumination sensor) disposed inside the electronic device 200. The processor 206 may determine a mounting state of the electronic pen 300 based on the intensity (e.g., a voltage change detection signal in a charging circuitry corresponding to a magnetic field signal received by the coil member) of a magnetic field signal received by at least one coil member 2265 or 236, which has been received through the first charging circuitry 201 and/or the second charging circuitry 202. A mounting state of the electronic pen 300 may also be determined by detecting the magnetic force of the magnet used as a magnetic force reaction member embedded in the electronic pen 300 with a magnetic force detecting sensor. The processor 206 may determine a charging mode (e.g., a general charging mode or a high-speed charging mode) through a third charging circuitry 301 disposed in the electronic pen 300 by controlling the first charging circuitry 201 and the second charging circuitry 202 based on the intensity of the magnetic field signal received by the at least one coil member 226 or 236. The processor 206 may determine a charging mode of the electronic pen 300 based on magnetic force detection information detected through the first magnetic force detecting sensor 203 or the second magnetic force detecting sensor 204 and folding state information of the second housing 220 or the third housing 230. The processor 206 may control the foldable electronic device 200 to enter the high-speed charging mode only when both housings 220 and 230 are folded even though the mounting state of the electronic pen 300 is recognized through the plurality of coil members 226 and 236.

Figure 12:
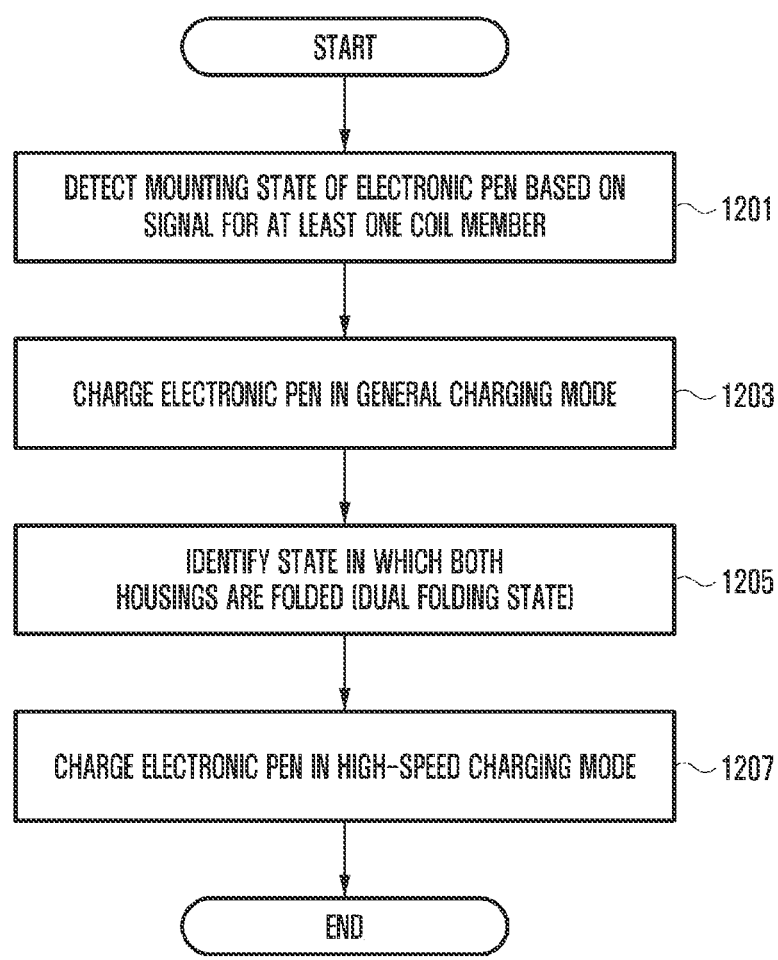
FIG. 12 illustrates a wireless charging procedure for an electronic pen according to an embodiment.
Figure 13:
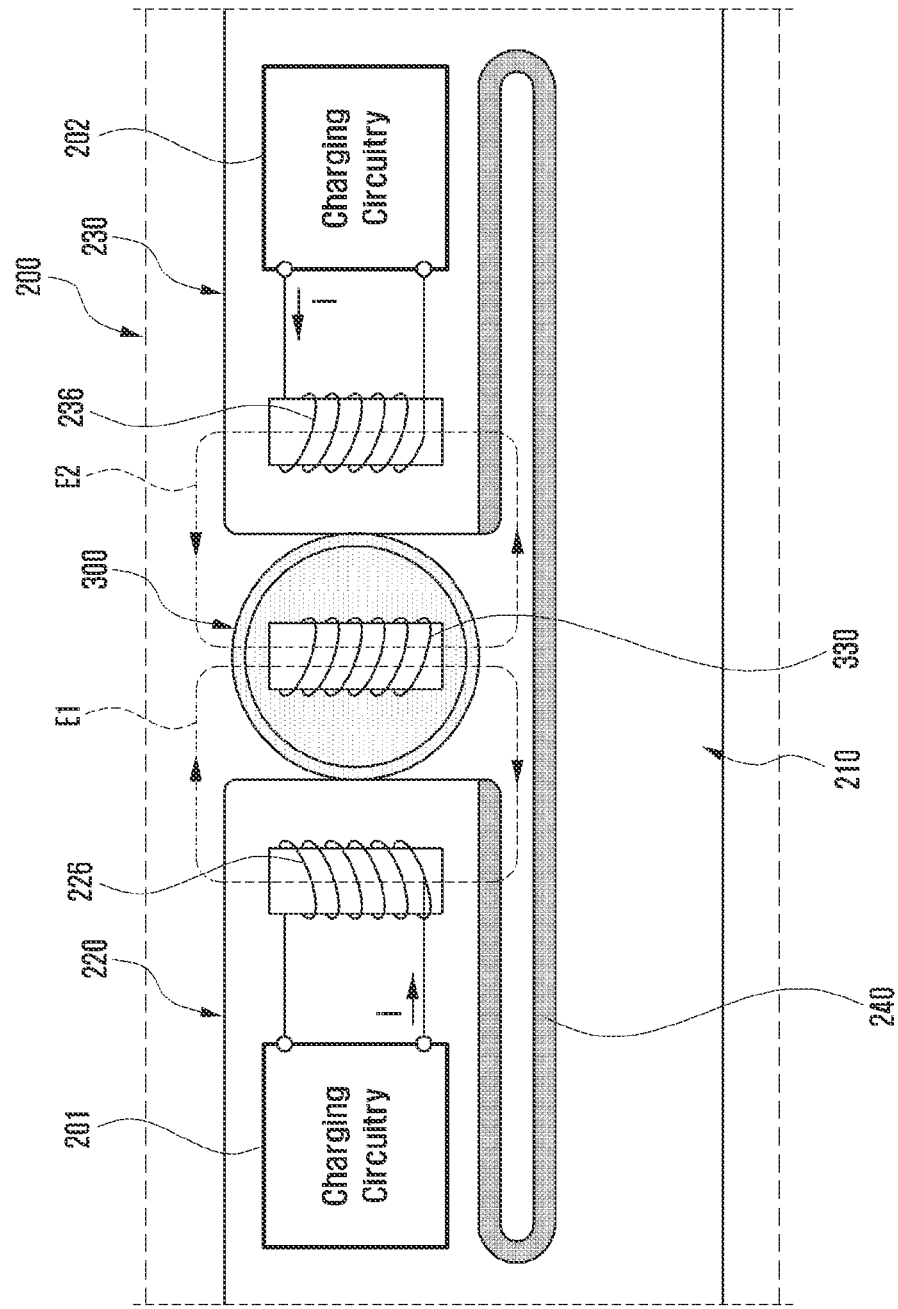
FIG. 13 is a configuration of a part of a foldable electronic device illustrating flows of a current for high-speed charging of an electronic pen according to an embodiment.

FIG. 12 illustrates a wireless charging procedure for an electronic pen 300 according to an embodiment. FIG. 13 is a configuration of a part of a foldable electronic device 200 illustrating flows of a current for high-speed charging of an electronic pen 300 according to an embodiment.

Referring to FIGS. 12 and 13, in step 1201, the foldable electronic device 200 may detect a mounting state of the electronic pen 300 based on the intensity of a magnetic field signal of a threshold value or more, which has been received through at least one coil member 226 or 236. In the foldable electronic device 200, if the magnetic force generating member 225 or 235 included in the at least one housing 220 or 230 and the magnetic force reaction member 310 or 320 of the electronic pen 300 are attached to each other, the third coil member 330 of the electronic pen 300 and the coil member 226 or 236 of the at least one housing 220 or 230 may be arranged on one axis.

In step 1203, when the foldable electronic device 200 detects at least one charging coil signal, the electronic pen 300 may be charged in the general charging mode. The processor 206 of the foldable electronic device 200 may measure the intensities of the magnetic field signals received by the coil members 226 and 236 of the plurality of arranged coil members (e.g., the at least one housing 220 or 230) and the third coil member 330 of the electronic pen 300, and may recognize a mounting state of the electronic pen 300 based on the measurement result of the threshold value or more. The processor 206 of the foldable electronic device 200 may determine the coil member 226 or 236 of the at least one housing 220 or 230 as a coil for wireless power transmission in the general charging mode, and may determine the third coil member 330 of the electronic pen 300 as a coil for wireless power reception. The foldable electronic device 200 may transmit wireless power through the at least one coil member 226 or 236 without considering an input direction of a current in the general charging mode.

In step 1205, the foldable electronic device 200 may provide the general charging mode and the high-speed charging mode based on a dual folding state in which both housings 220 and 230 are folded. The foldable electronic device 200 may determine a dual folding state based on the intensities of magnetic field signals of a threshold value or more, which have been measured through the first magnetic field detecting sensor 203 and the second magnetic field detecting sensor 204 disposed in the first housing 210. The foldable electronic device 200 may control the foldable electronic device 200 to be operated in the general charging mode only when neither of the two housings 220 and 230 is folded even though the mounting state of the electronic pen 300 is recognized through the plurality of coil members 226 and 236.

In step 1207, as illustrated in FIG. 13, when both the two housings 220 and 230 are in a folded state (a dual folding state), the foldable electronic device 200 may provide a high-speed charging mode in which an input direction of a current is controlled, such that the direction of a magnetic field E1 generated by the first coil member 226 of the second housing 220 is identical to the direction of a magnetic field E2 generated by the second coil member 236 of the third housing 230. In another embodiment, the foldable electronic device 200 may execute the high-speed charging mode when a charging operation is detected when the foldable electronic device 200 is mounted on a charging or wireless charging pad through a wired charging cable even though both of the housings 220 and 230 are not folded.

Figure 14:
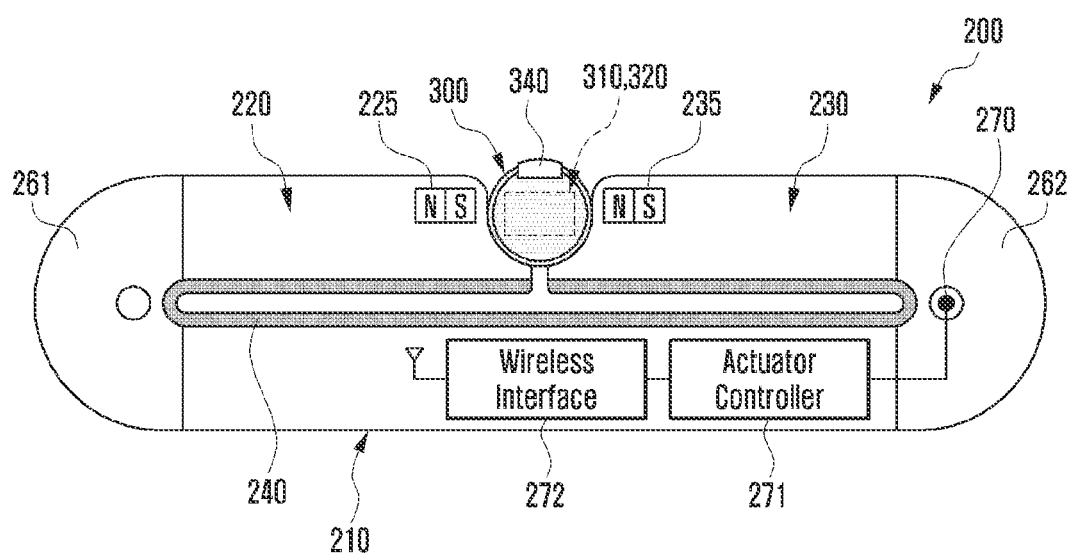
FIG. 14 is a partially cross-sectional view of a foldable device illustrating an automatic opening/closing configuration of a housing through an electronic pen according to an embodiment.
Figure 14:
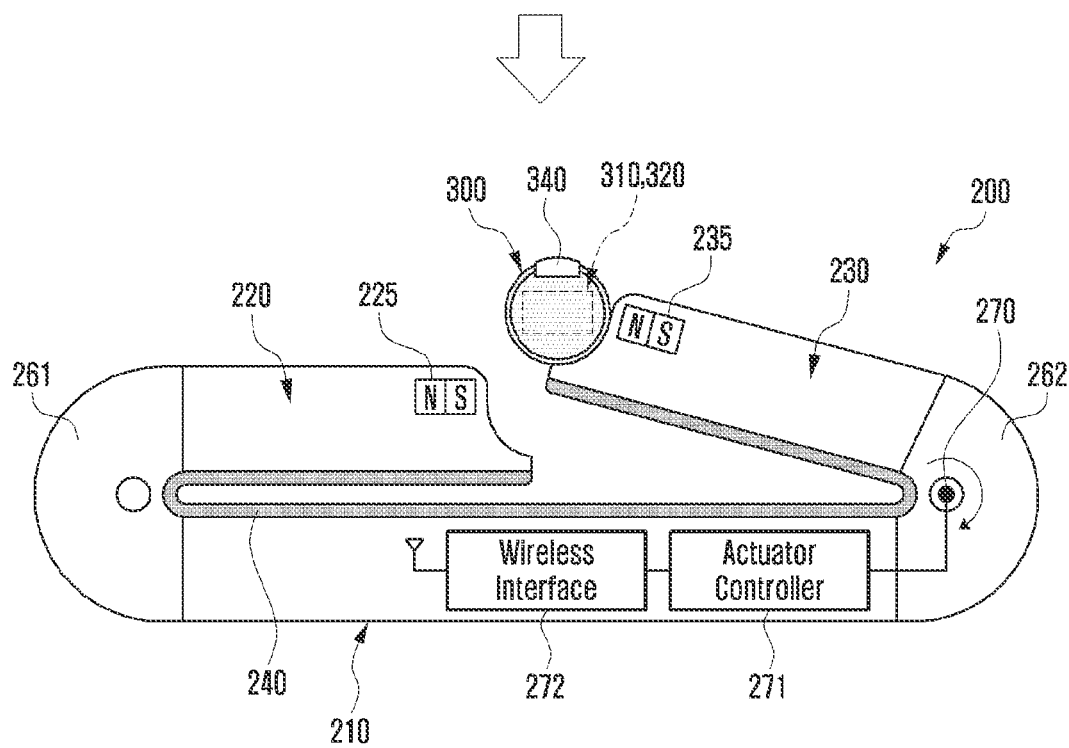

FIG. 14 is a partially cross-sectional view of a foldable electronic device 200 illustrating an automatic opening/closing configuration of a housing 230 through an electronic pen 300 according to an embodiment.

Referring to FIG. 14, the foldable electronic device 200 may include an automatic opening/closing device, such as a rotary motor 270 and an actuator controller 271, which automatically releases the folding state of the at least one housing 230 through an input of a button 340 disposed in the electronic pen 300. The electronic pen 300 may transmit an input (e.g., an input through a mechanical key button, a touch input through a touch pad a double tab or a long tab), a force sensor input, an input through an ultrasonic sensor, or an input through a fingerprint sensor) signal of a button 340 disposed inside the electronic pen 300, to the foldable electronic device 200, through a wireless communication device a short-range wireless communication circuit). The foldable electronic device 200 may control the automatic opening/closing device connected to the hinge module 262 by receiving a signal received from the electronic pen 300 through the wireless communication device 272 (e.g., a short-range wireless communication circuit).

The automatic opening/closing device may perform an automatic opening/closing operation based on an attachment state of the electronic pen 300. For example, in the folded state, when the electronic pen 300 is separated from the pen accommodating part, an automatic opening/closing operation may be performed by recognizing an off state of a magnetic field signal of a wireless charging coil. Similarly, in the unfolded state, when the electronic pen 300 is accommodated in the pen accommodating part, an automatic opening/closing operation may be performed. The operations may be performed through setting of a user.

Figure 15A:
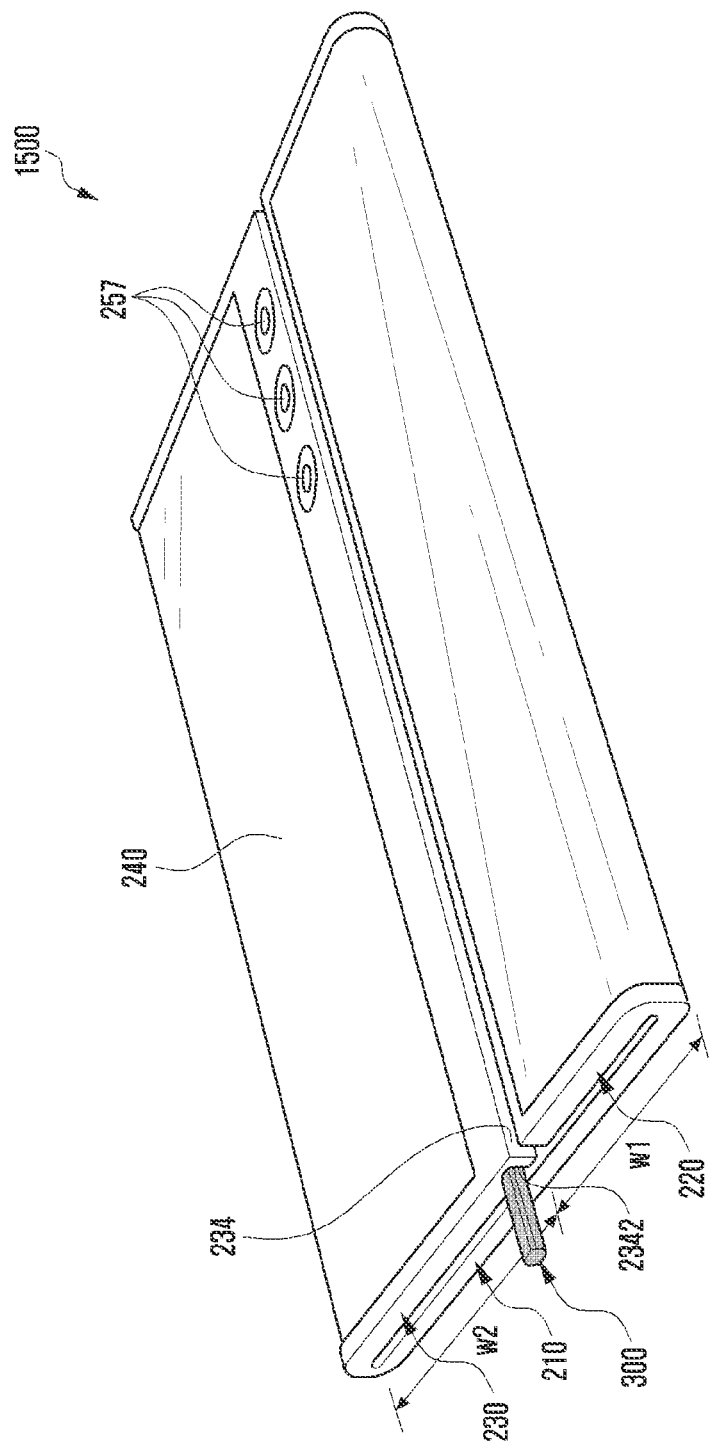
FIG. 15A is a perspective view of a foldable electronic device having an electronic pen according to an embodiment.
Figure 15B:
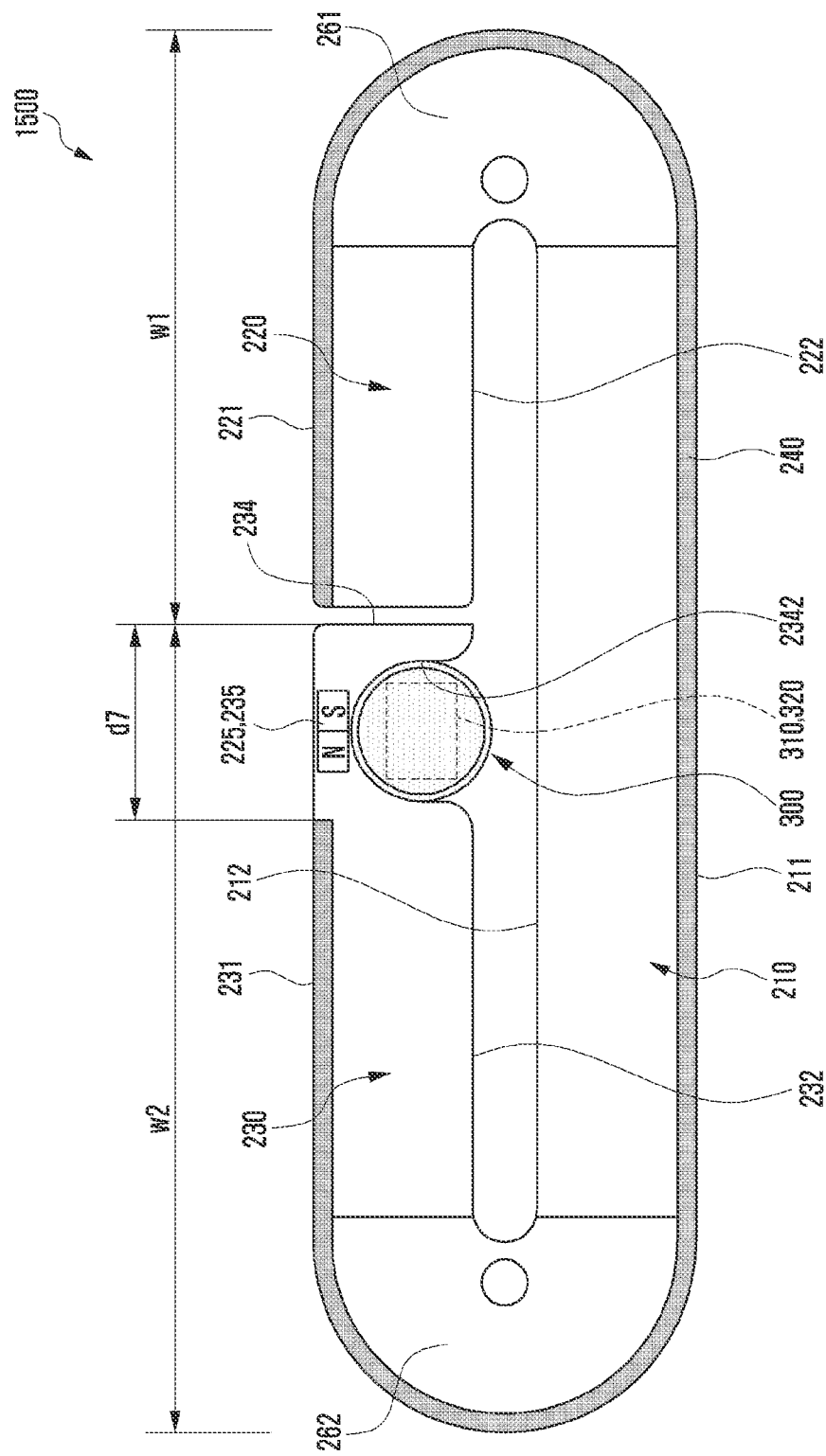
FIG. 15B is a partially sectional view of a foldable electronic device having an electronic pen according to an embodiment.

FIG. 15A is a perspective view of a foldable electronic device 1500 having an electronic pen 300 according to an embodiment, and FIG. 15B is a partially sectional view of a foldable electronic device 1500 having an electronic pen 300 according to an embodiment.

Referring to FIGS. 15A and 15B, a foldable electronic device 1500 may include an asymmetric recess structure in which a recess 2342 is provided only in the edge 234 of one housing 230. For example, the foldable electronic device 1500 may include a second housing 220 having a first width W1 connected to one side of the first housing 210, and a third housing 230 having a second width W2 that is larger than the width W1, which is connected to an opposite side of the first housing 210. The foldable electronic device 1500 may have a recess structure, into which the electronic pen 300 may be inserted in a lateral direction. The third housing 230 may include a bezel area (e.g., a black matrix (BM) area) having a distance d7, by which a recess 2342, in which the electronic pen 300 is accommodated through the second edge 234 may be provided. Accordingly, the foldable electronic device 1500 may further include an optical input device such as a camera 257 by using a bezel area that is relatively widened. Then, the electronic pen 300 may be mounted on a recess structure, into which the electronic pen 300 may be inserted from a side direction of the foldable electronic device 1500.

The foldable electronic device 1500 may be configured such that at least one magnetic force generating member 225 or 235 (e.g., a magnet) is disposed only in the third housing 230 in correspondence to the recess 2342. Alternatively, each of the magnetic force generating members 225 and 235 may include an electromagnet that generates a magnetic force through application of a voltage. In this case, the magnetic force reaction members 310 and 320 (e.g., magnets) of the electronic pen 300 may be disposed at a location where a repulsive force is generated when a voltage is applied to the electromagnet. Accordingly, as a voltage is applied to the electromagnet when the electronic pen 300 is mounted in the recess 2342, the electronic pen 300 may be naturally pushed to the outside of the foldable electronic device 1500.

As described above, the foldable electronic device herein can contribute to slimness of the electronic device and can improve portability by providing a stable pen accommodating part, in which the electronic pen may be accommodated through a folding structure of the housings. The foldable electronic device can also charge the battery of the electronic pen accommodated in the pen accommodating part in various charging modes (e.g., a general charging mode or a high-speed charging mode) through the folding structure of the peripheral housings.

As described above, an electronic device according to an embodiment may include a foldable housing including a first housing, a second housing connected to one side of the first housing to be rotatable through a first hinge module and disposed to at least partially face the first housing in a folded state, and a third housing connected to an opposite side of the first housing to be rotatable through a second hinge module and disposed to at least partially face the first housing in a folded state, the foldable housing may include a pen accommodating part defined through a spaced space between a first edge of the second housing and a second edge of the third housing, a flexible display extending from at least a portion of the second housing to at least a portion of the third housing through the first housing, and an electronic pen at least partially accommodated in the pen accommodating part and including at least one magnetic force reaction member in an interior space thereof, the electronic device may include at least one magnetic force generating member disposed around the first edge of the second housing and/or the second edge of the third housing, and when the electronic pen is mounted in the pen accommodating part, the location of the electronic pen may be maintained through the magnetic force reaction member.

The pen accommodating part may be configured such that the electronic pen corresponds to an outer surface of the electronic device or is lower than the outer surface of the electronic device.

The at least one magnetic force generating member may include a first magnetic force generating member disposed around the first edge of the second housing, and a second magnetic force generating member disposed around the second edge of the third housing.

When the electronic pen is accommodated in the pen accommodating part, the at least one magnetic force generating member may include a first magnetic force reaction member disposed at a location at which the first magnetic force reaction member reacts a magnetic force of the first magnetic force generating member, and a second magnetic force reaction member disposed at a location at which the second magnetic force reaction member reacts a magnetic force of the second magnetic force generating member.

The first magnetic force generating member and the second magnetic force generating member may be disposed to be symmetrical to each other in inclined directions with respect to the pen accommodating part.

The at least one magnetic force generating member may include a magnet or an electromagnet.

The at least one magnetic force reaction member may include a magnet or a metal member that reacts with a magnetic force.

The electronic device may further include a first recess disposed through at least a portion of the first edge, and a second recess disposed through at least a portion of the second edge, and when the second housing and the second housing contact each other, the pen accommodating part may be disposed through the first recess and the second recess.

The first recess and/or the second recess may have a shape corresponding to an outer surface of the electronic pen.

According to various embodiments, in a folded state of the electronic device, a first distance between the first edge and the second edge at a location that is near the display may be less than a second distance between the first edge and the second edge at a location that is far from the display.

The electronic device may include an out-folding type electronic device in which the flexible display is exposed to the outside, and when any one of the second housing or the third housing is unfolded, the electronic pen may maintain a state in which the electronic pen is attached to the recess of the remaining housing.

The electronic device may include an in-folding type electronic device in which the flexible display is disposed not to be viewed from the outside, and when any one of the second housing or the third housing is unfolded, the electronic pen may maintain a state in which the electronic pen is attached to the recess of the unfolded housing.

As described above, an electronic device according to an embodiment may include a foldable housing including a first housing, a second housing connected to one side of the first housing to be rotatable through a first hinge module and disposed to at least partially face the first housing in a folded state, and a third housing (connected to an opposite side of the first housing to be rotatable through a second hinge module and disposed to at least partially face the first housing in a folded state, the foldable housing may include a pen accommodating part defined through a spaced space between a first edge of the second housing and a second edge of the third housing in the folded state, a flexible display extending from at least a portion of the second housing to at least a portion of the third housing through the first housing, a wireless charging module disposed in an interior space of the electronic device, the wireless charging module including a first coil member disposed to a vicinity of the first edge of the second housing and connected to a first charging circuitry, and a second coil member disposed to a vicinity of the second edge of the third housing and connected to a second charging circuitry, and an electronic pen at least partially accommodated in the pen accommodating part and including at least one third coil member connected to a third charging circuitry in an interior space thereof, wherein when the electronic pen is mounted in the pen accommodating part, the third coil member is disposed at a location at which the third coil member maintains in an arrangement state in which the third coil member performs a wireless charging operation with the first coil member and/or the second coil member.

The first coil member, the second coil member, and/or the third coil member may include a solenoid type coil or an FPCB type flat plate coil.

The electronic device may further include a processor, and the processor may detect whether the electronic pen is mounted in the pen accommodating part based on the intensity of an electromagnetic signal received from the first coil member and/or the second coil member.

The electronic device may further include at least one sensor configured to detect a folding state of the electronic device.

The processor may detect a folding state of the second housing and/or the third housing through the at least one sensor.

The processor may control a charging mode of the electronic pen through the first charging circuitry and/or the second charging circuit, based on the folding state of the second housing and/or the third housing through the at least one sensor.

When detecting that both of the second housing and the third hosing are in the folded state, the processor may control the electronic pen to be charged in a high-speed charging mode through the first charging circuitry and/or the second charging circuit.

When detecting that only any one of the second housing and the third hosing is in the folded state, the processor may control the electronic pen to be charged in a general charging mode through the first charging circuitry and/or the second charging circuit.

While the disclosure has been particularly shown and described with reference to certain embodiments thereof, it will be understood by those skilled in the art that various changes in form and details may be made therein without departing from the scope of the subject matter as defined by the appended claims and their equivalents.

What is claimed is:

1. An electronic device, comprising:
    an electronic pen; and
    a foldable housing comprising:
        a first housing;
        a second housing rotatably connected to one side of the first housing;
        a third housing rotatably connected to an opposite side of the first housing; and
        a recess, which faces at least a part of the first housing in a folded state, provided in a first end of a bezel area of the third housing,
    wherein the recess is configured to accommodate the electronic pen when the electronic pen is inserted into the electronic device between the recess and the first housing.

2. The electronic device of claim 1, further comprising:
    at least one magnetic force generating member disposed inside the bezel area of the third housing, and
    at least one magnetic force reaction member disposed inside the electronic pen.

3. The electronic device of claim 2, wherein the at least one magnetic force generating member comprises:
    a first magnetic force generating member disposed in a left side of the first end of the bezel area of the third housing; and
    a second magnetic force generating member disposed beside the first magnetic force generating member in a right side of the first end of the bezel area of the third housing.

4. The electronic device of claim 3, further comprising:
    a flexible display extending from at least a portion of the second housing to at least a portion of the third housing through the first housing,
    wherein, when the electronic pen is accommodated in the recess, a location of the electronic pen is maintained through the at least one magnetic force reaction member.

5. The electronic device of claim 3, wherein, when the electronic pen is accommodated in the recess, the at least one magnetic force reaction member comprises:
    a first magnetic force reaction member disposed at a location where the first magnetic force reaction member reacts with a magnetic force of the first magnetic force generating member; and
    a second magnetic force reaction member disposed at a location where the second magnetic force reaction member reacts with a magnetic force of the second magnetic force generating member.

6. The electronic device of claim 5, wherein the first magnetic force generating member and the second magnetic force generating member are disposed to be symmetrical to each other in inclined directions with respect to the first end of the bezel area of the third housing.

7. The electronic device of claim 2, wherein the at least one magnetic force generating member comprises a magnet or an electromagnet, and
    wherein the at least one magnetic force reaction member comprises a magnet or a metal member that reacts with a magnetic force.

8. The electronic device of claim 1, wherein the recess has a shape corresponding to an outer surface of the electronic pen.

9. The electronic device of claim 1, further comprising an optical device disposed in a second end of the bezel area of the third housing opposite to the first end of the bezel area of the third housing.

10. The electronic device of claim 4, further comprising an out-folding type electronic device in which the flexible display is exposed to an outside,
    wherein, when the second housing or the third housing is unfolded, the electronic pen maintains a state in which the electronic pen is attached to the recess of the third housing.

11. The electronic device of claim 10, further comprising an in-folding type electronic device in which the flexible display is disposed not to be viewed from the outside in the folded state, wherein, when the second housing or the third housing is unfolded, the electronic pen maintains a state in which the electronic pen is attached to the recess of the third housing.

12. An electronic device, comprising:
an electronic pen;
a foldable housing comprising:
   a first housing;
   a second housing rotatably connected to one side of the first housing;
   a third housing rotatably connected to an opposite side of the first housing; and
   a recess, which faces at least a part of the first housing in a folded state, provided in a first end of a bezel area of the third housing, the recess being configured to accommodate the electronic pen when the electronic pen is inserted into the electronic device between the recess and the first housing; and
a wireless charging module disposed in an interior space of the electronic device, the wireless charging module comprising:
   a first coil member disposed to an edge of the second housing and connected to a first charging circuit; and
   a second coil member disposed to an edge of the third housing and connected to a second charging circuit,
wherein the electronic pen comprises at least one third coil member connected to a third charging circuit inside the electronic pen, and
wherein, when the electronic pen is mounted in the recess, the third coil member is disposed at a location at which the third coil member maintains an arrangement state in which the third coil member performs a wireless charging operation with the first coil member and/or the second coil member.

13. The electronic device of claim 12, wherein the first coil member, the second coil member, and/or the third coil member comprises a solenoid type coil or a flexible printed circuit board type flat plate coil.

14. The electronic device of claim 13, further comprising a processor configured to detect whether the electronic pen is mounted in the recess based on an intensity of an electromagnetic signal received from the first coil member and/or the second coil member.

15. The electronic device of claim 14, further comprising at least one sensor configured to detect a folding state of the electronic device.

16. The electronic device of claim 15, wherein the processor is further configured to detect the folding state of the second housing and/or the third housing through the at least one sensor.

17. The electronic device of claim 16, wherein the processor is further configured to control a charging mode of the electronic pen through the first charging circuit and/or the second charging circuit, based on the folding state of the second housing and/or the third housing detected through the at least one sensor.

18. The electronic device of claim 17, wherein, when detecting that both of the second housing and the third hosing are in the folded state, the processor is further configured to control the electronic pen to be charged in a high-speed charging mode through the first charging circuit and/or the second charging circuit.

19. The electronic device of claim 17, wherein, when detecting that only one of the second housing and the third housing is in the folded state, the processor is further configured to control the electronic pen to be charged in a general charging mode through the first charging circuit and/or the second charging circuit.

20. The electronic device of claim 12, further comprising an optical device disposed in a second end of the bezel area of the third housing opposite to the first end of the bezel area of the third housing.

* * * * *